United States Patent [19]

Rudnick et al.

[11] 4,211,997

[45] Jul. 8, 1980

[54] METHOD AND APPARATUS EMPLOYING AN IMPROVED FORMAT FOR RECORDING AND REPRODUCING DIGITAL AUDIO

[75] Inventors: Paul J. Rudnick, Oakland; Alastair M. Heaslett, Palo Alto, both of Calif.

[73] Assignee: Ampex Corporation, Redwood City, Calif.

[21] Appl. No.: 957,270

[22] Filed: Nov. 3, 1978

[51] Int. Cl.² .................... G06F 11/12; G11B 27/00
[52] U.S. Cl. ..................................... 371/38; 360/53; 371/51
[58] Field of Search ............... 340/146.1 F, 146.1 AL; 360/48, 53

[56] References Cited

U.S. PATENT DOCUMENTS

| | | | |
|---|---|---|---|
| 3,774,154 | 11/1973 | Devore et al. | 340/146.1 F |
| 4,052,698 | 10/1977 | Ragle | 340/146.1 AL |
| 4,143,406 | 3/1979 | Tsuiki et al. | 360/48 |
| 4,145,683 | 3/1979 | Brookhart | 340/146.1 F |
| 4,146,099 | 3/1979 | Matsushima et al. | 340/146.1 F |

Primary Examiner—Charles E. Atkinson
Attorney, Agent, or Firm—Robert G. Clay; George B. Almeida

[57] ABSTRACT

An audio signal is sampled, quantized and the values are stored in a specific digital data block/sub-block format on alternate tracks of a recording medium. The block-/sub-block format provides an inherent simplification of error correction techniques, and consists of dividing the digital audio data into groups of digital words, and recording alternate words on separate tracks in the medium. Cyclic redundancy check characters, synchronization, and parity information are selectively interspersed with the data to define sub-blocks which in turn are combined into separate blocks of the block/sub-block arrangement. On reproduce, any errors, dropouts, etc., are detected and corrected or concealed to reconstitute the original audio signal. Editing is facilitated by the separated block arrangement which allows entering and exiting the record mode without destroying any data.

23 Claims, 26 Drawing Figures

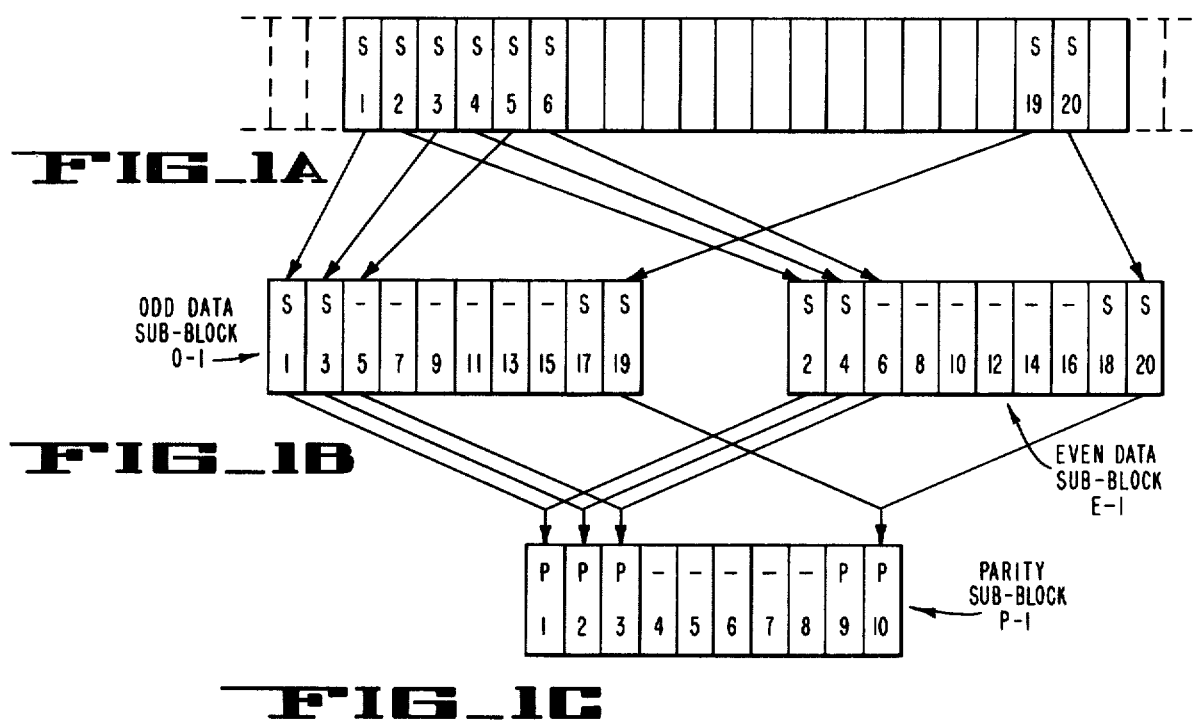
FIG_1A
FIG_1B
FIG_1C
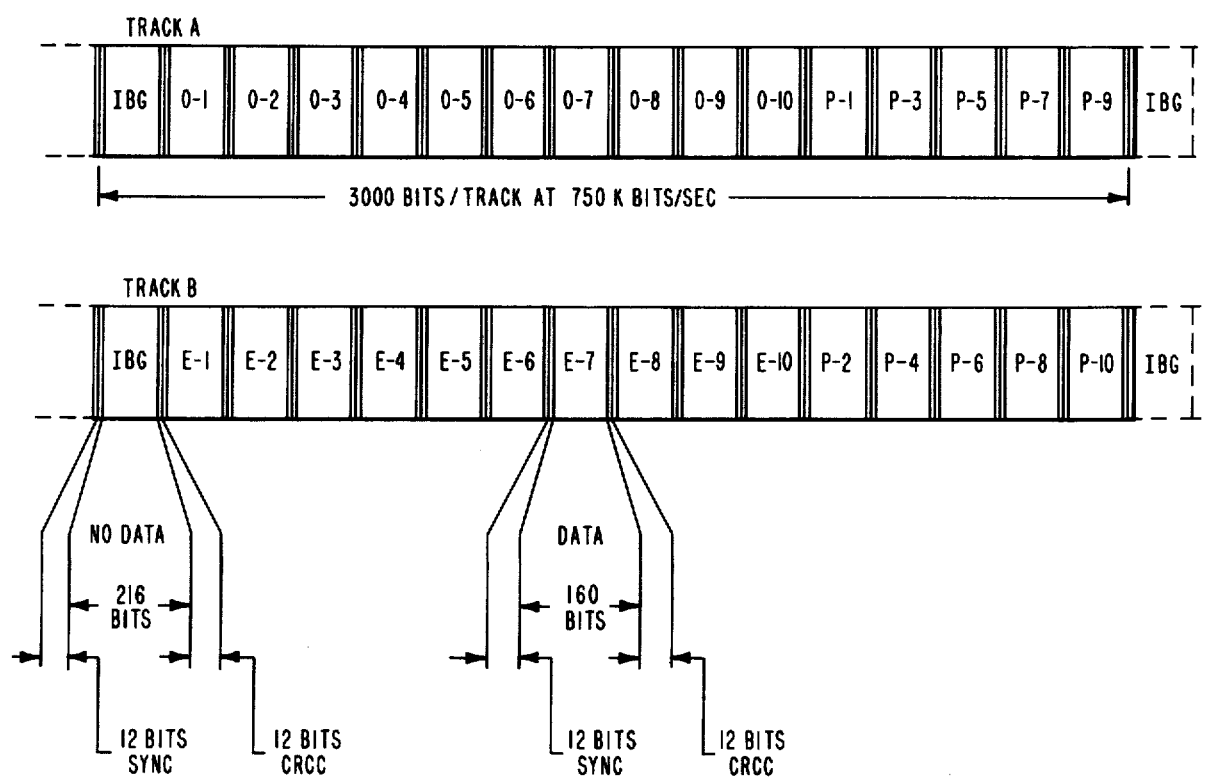
FIG_2

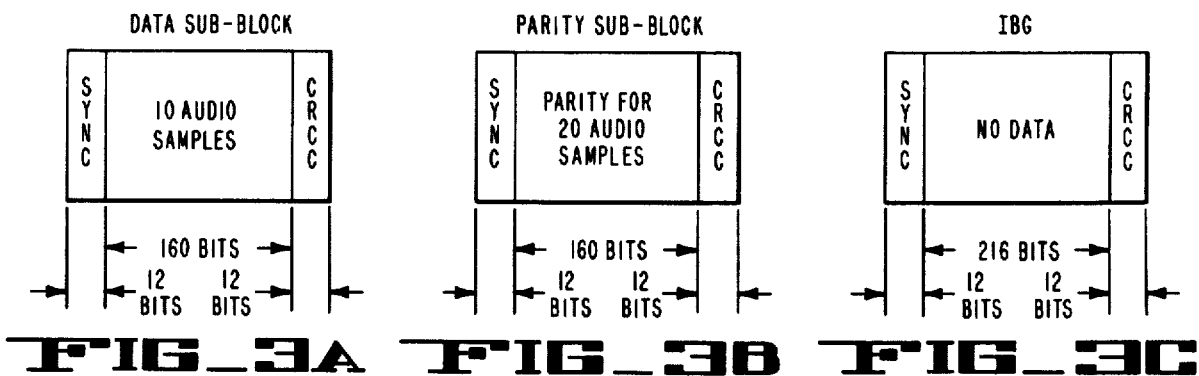
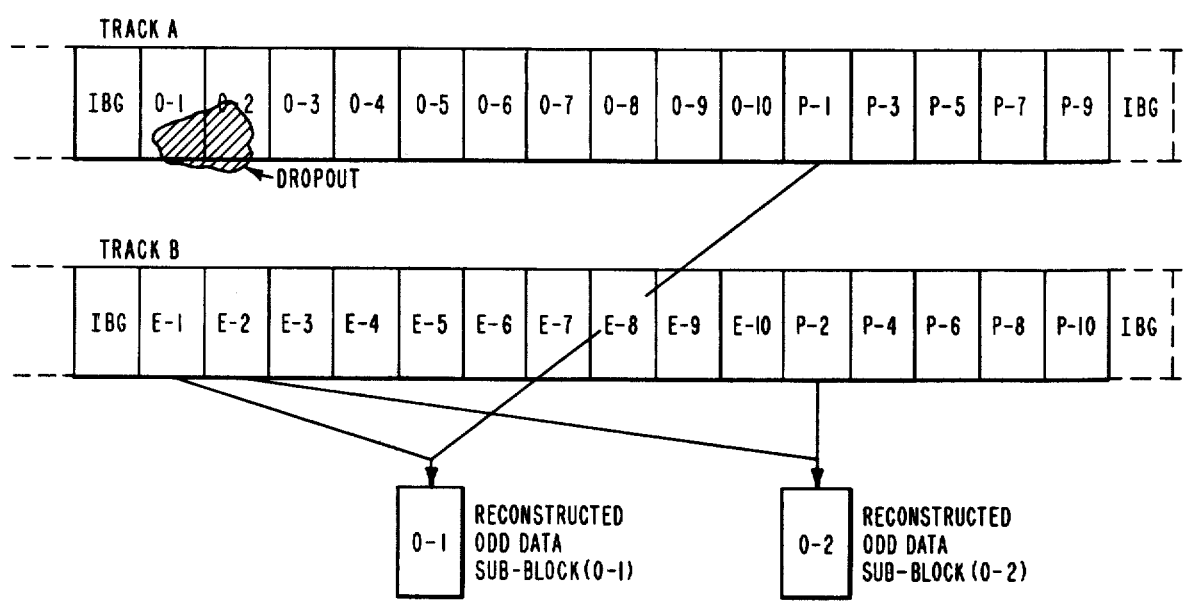
FIG_4
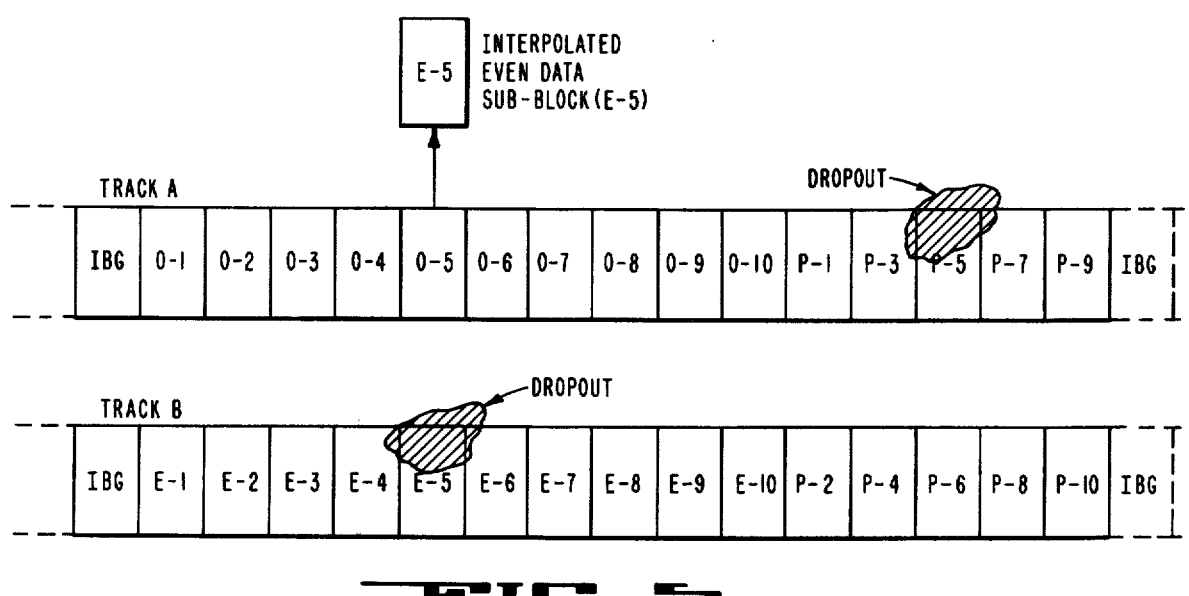
FIG_5

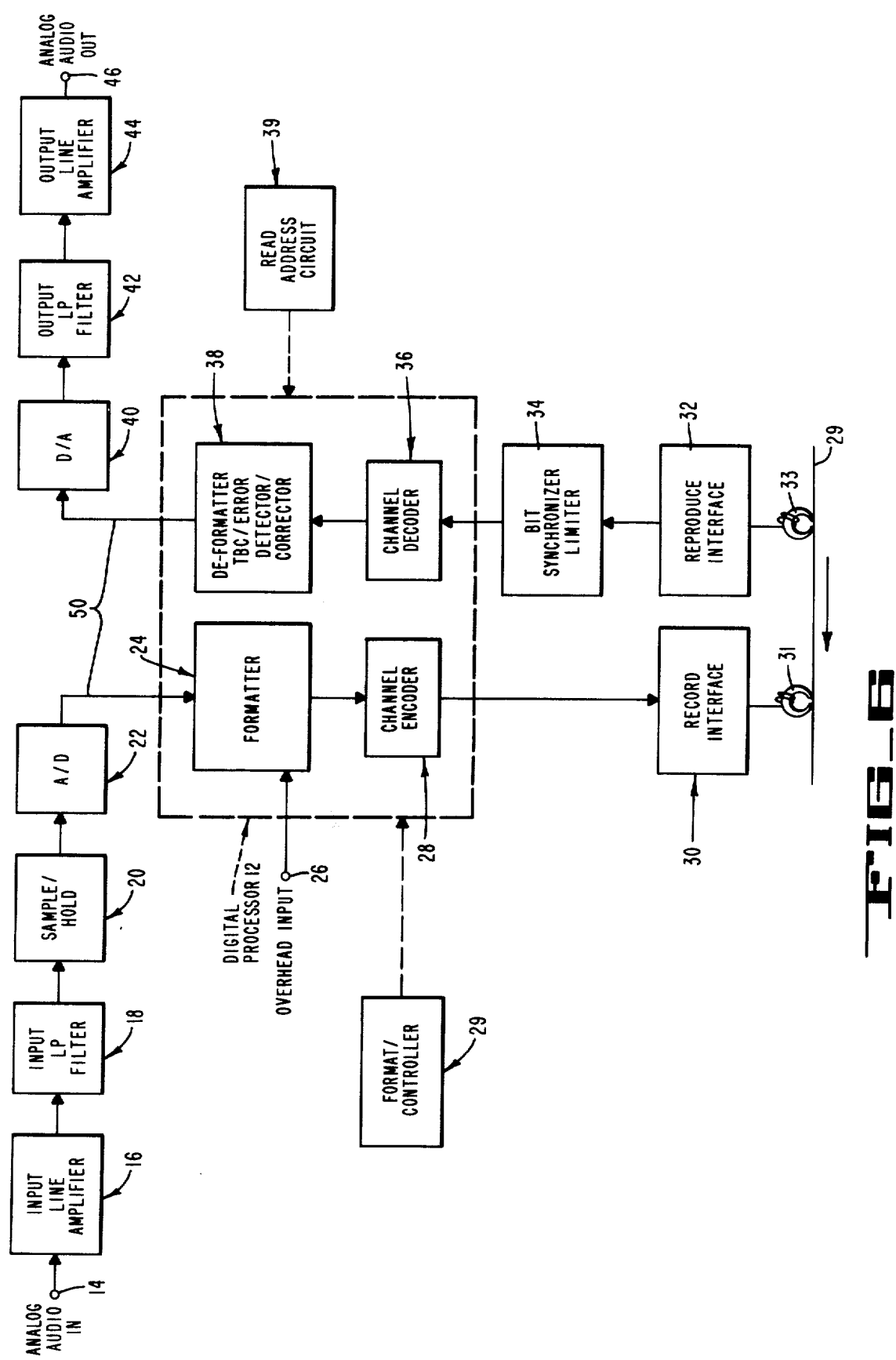

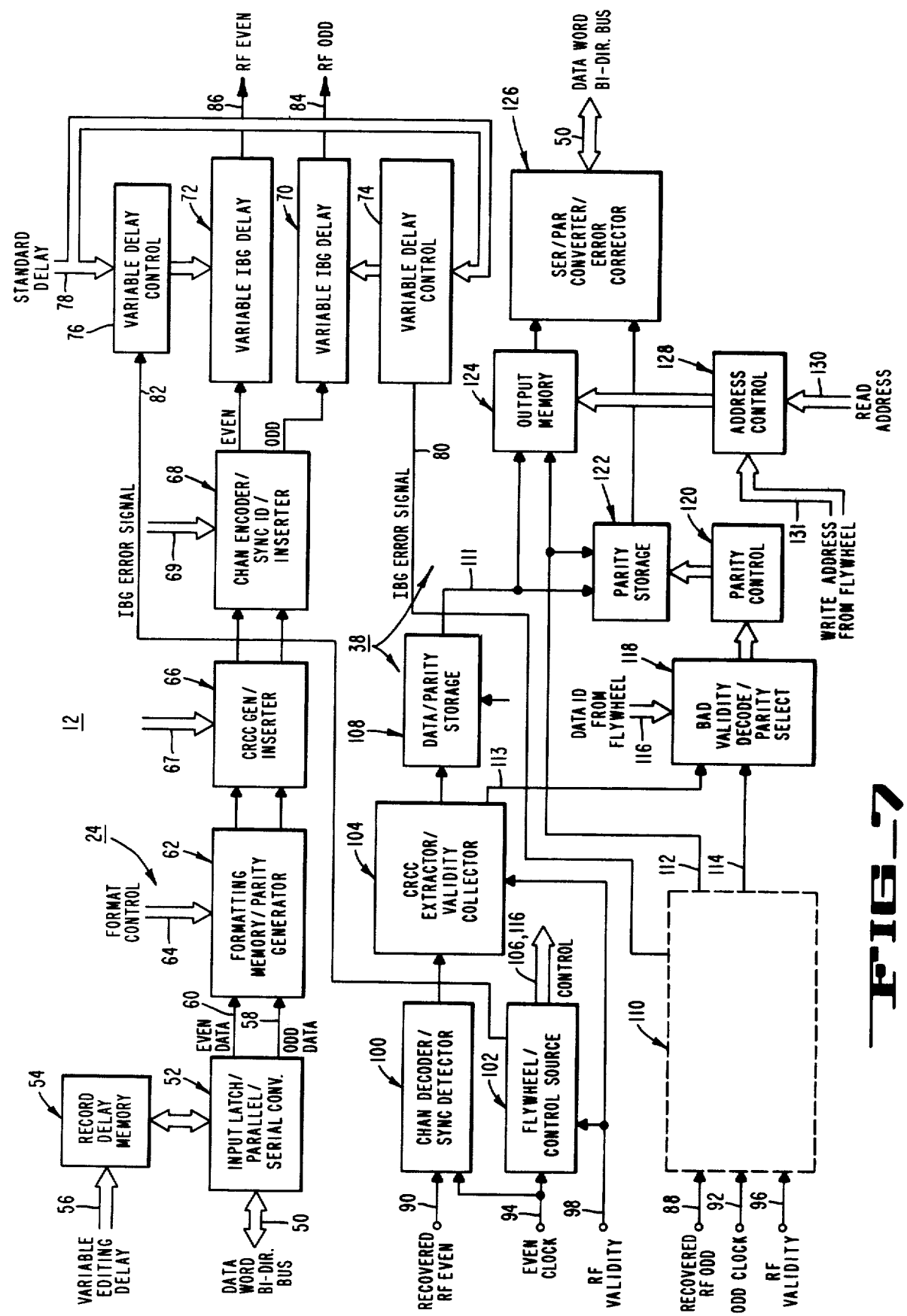
FIG_7

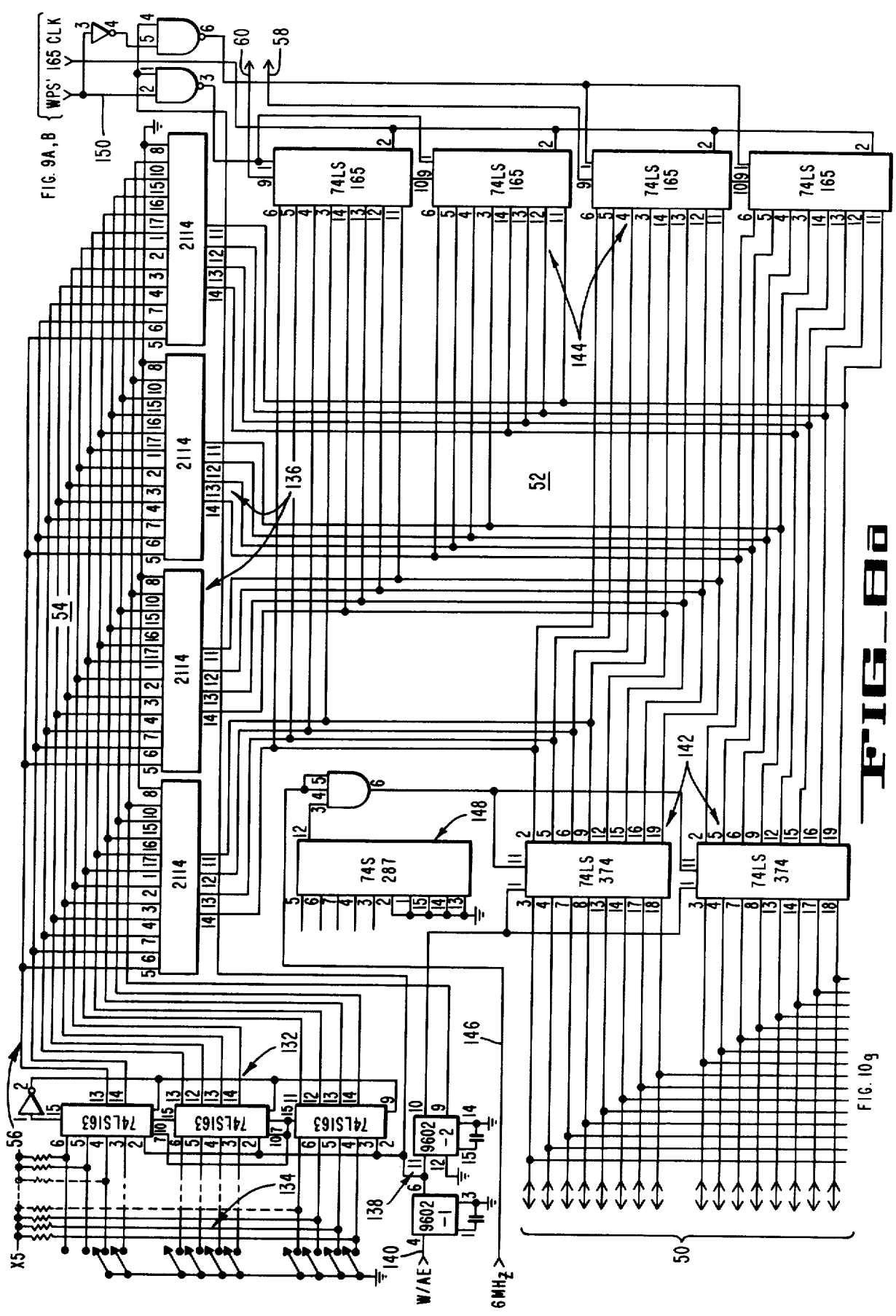

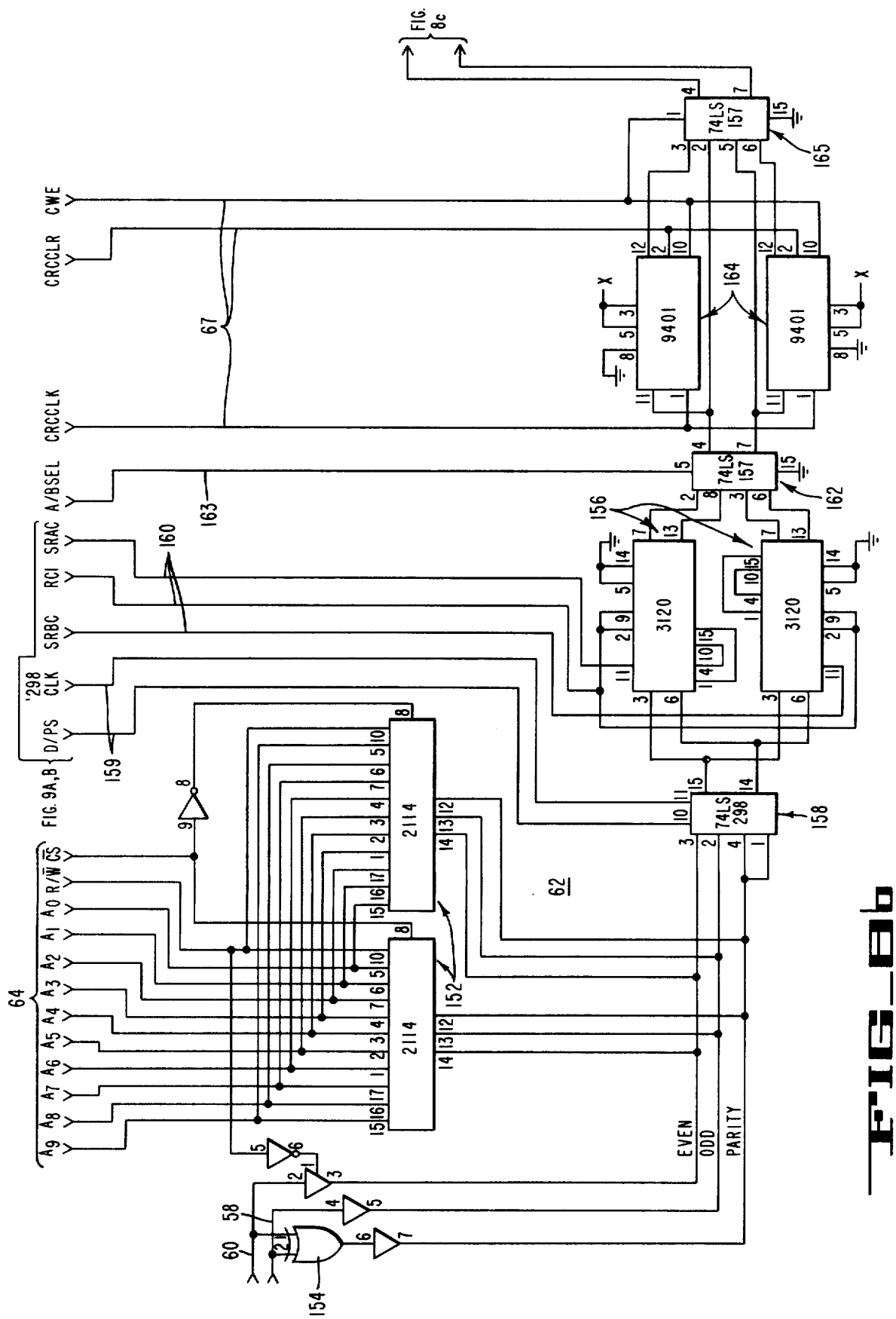

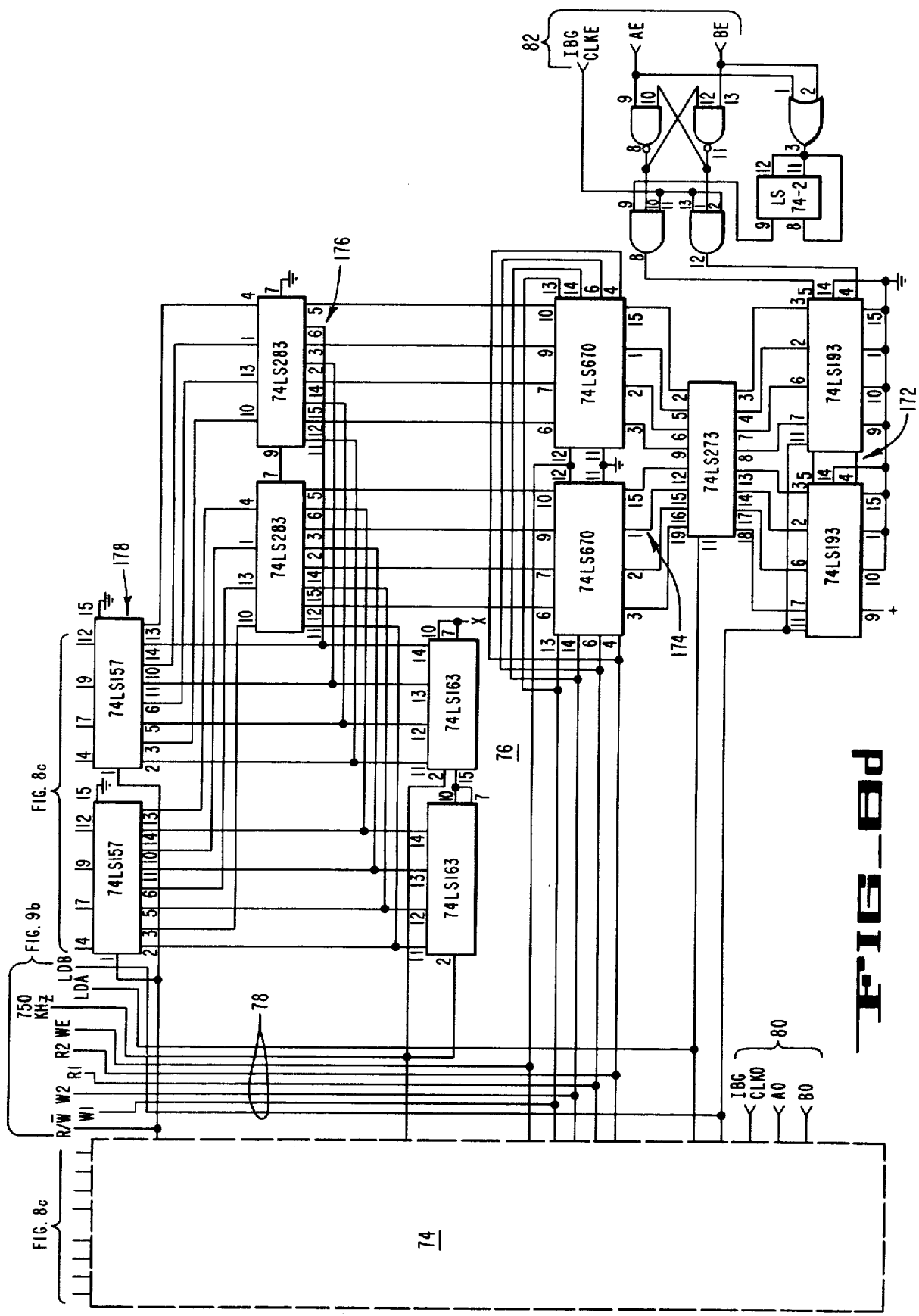

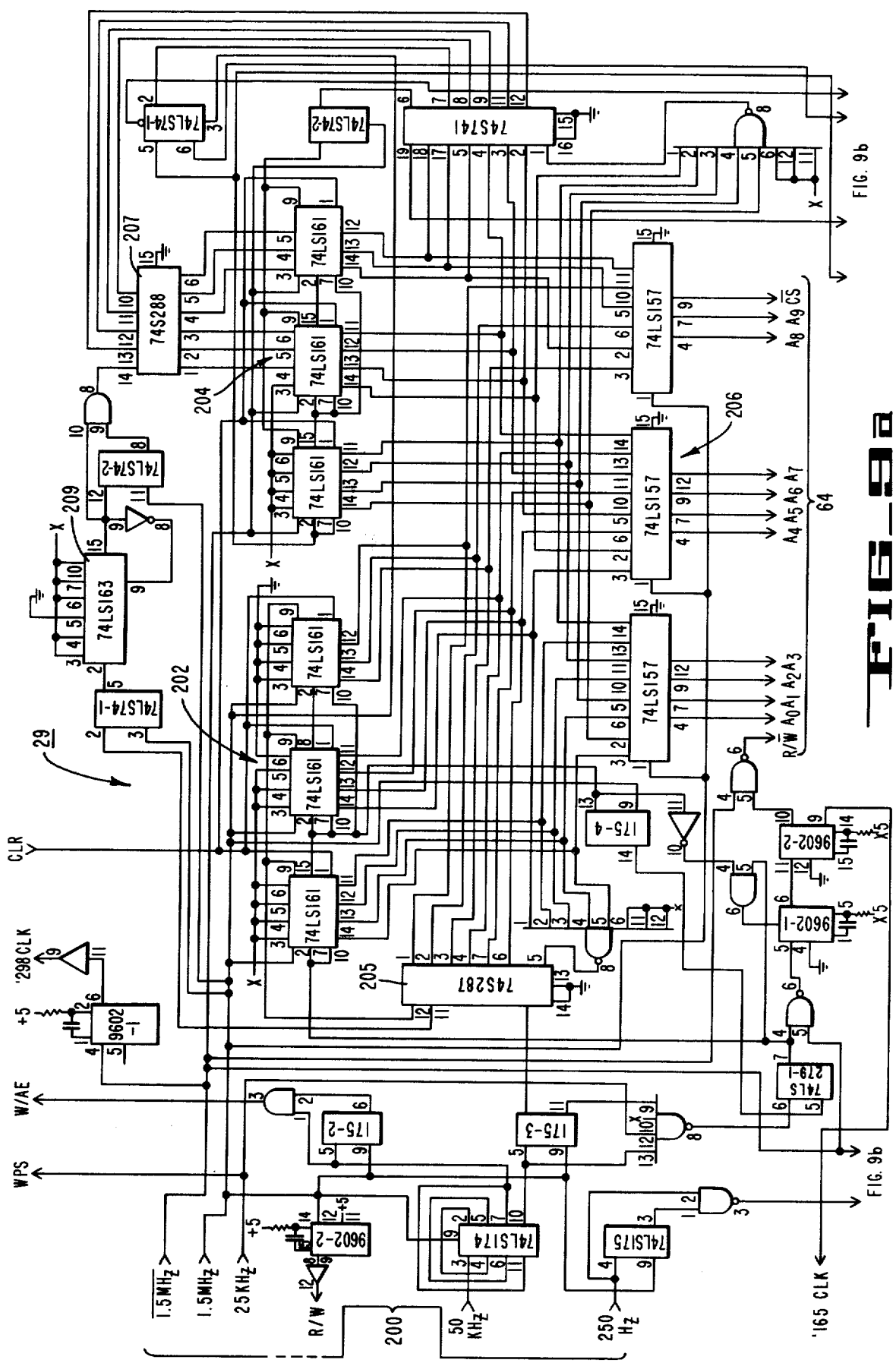
FIG_9a

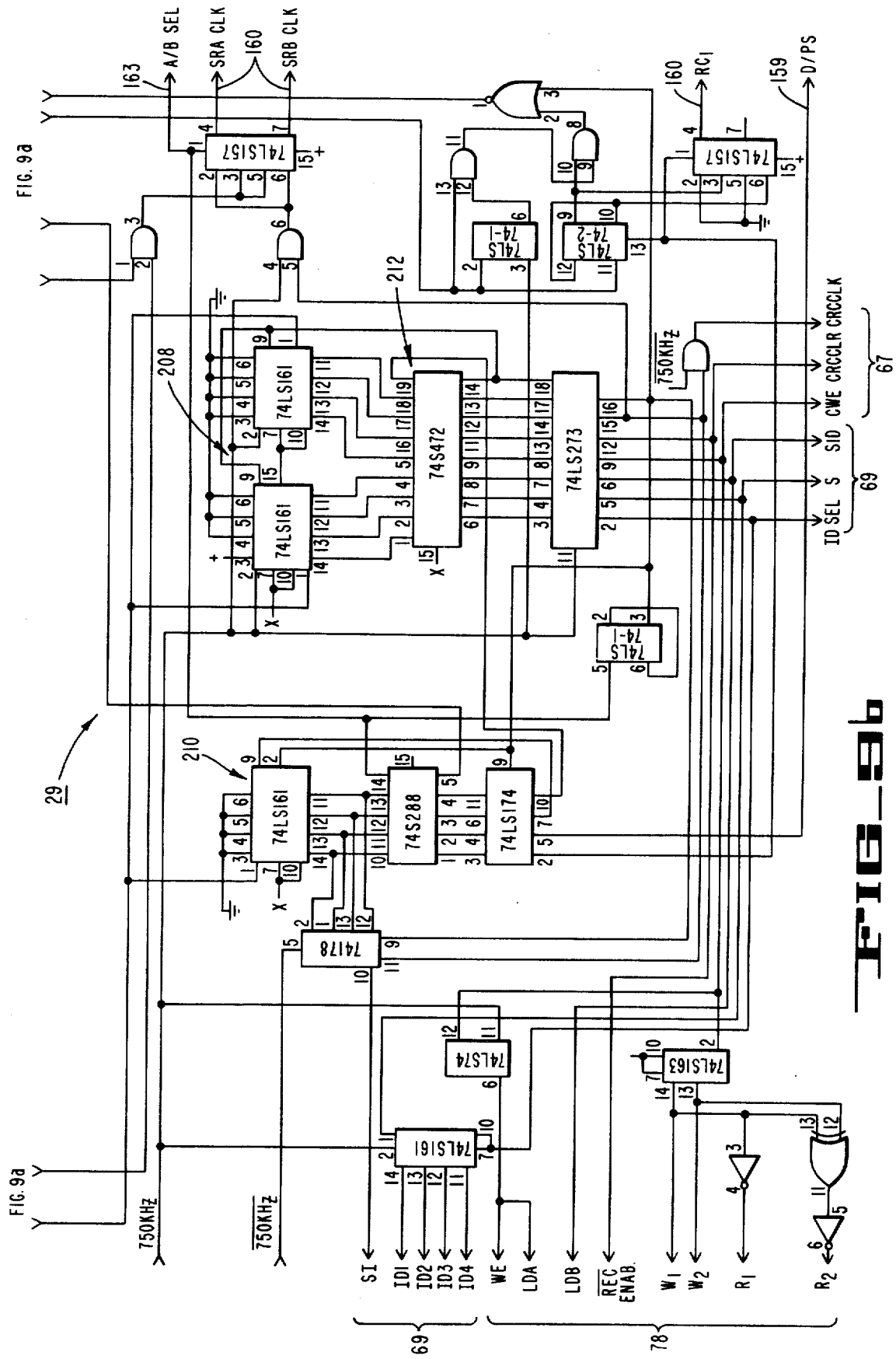

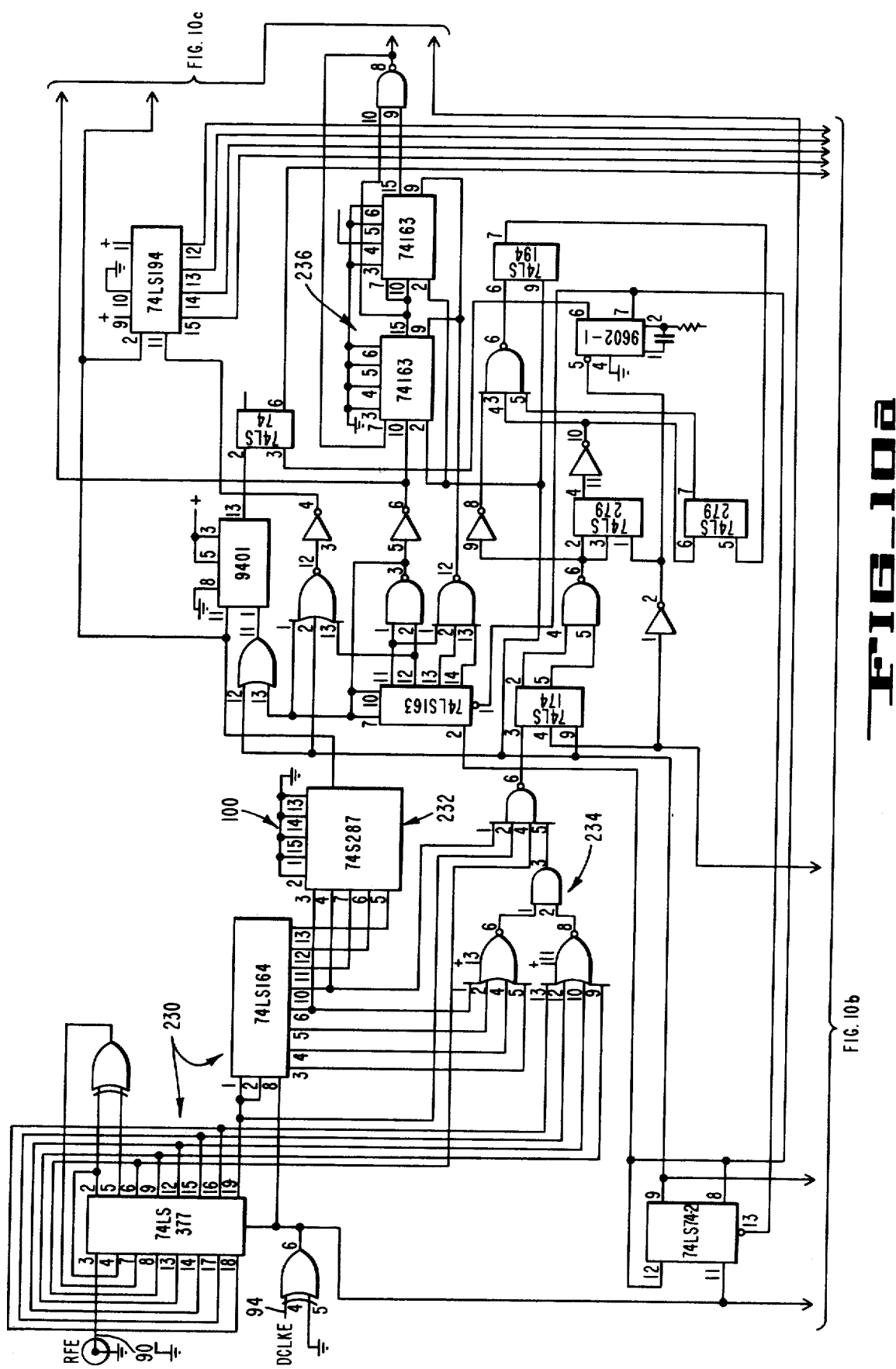

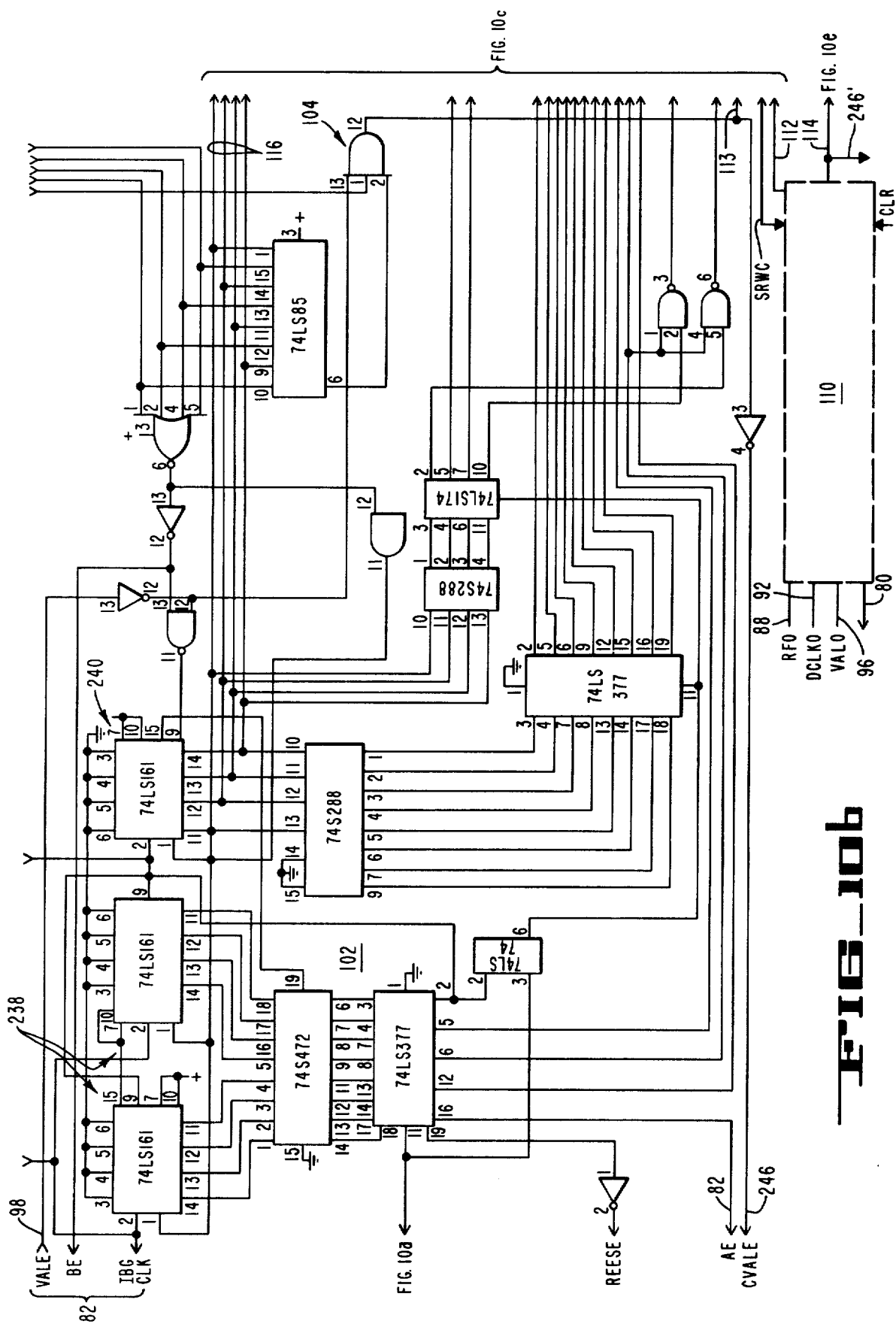

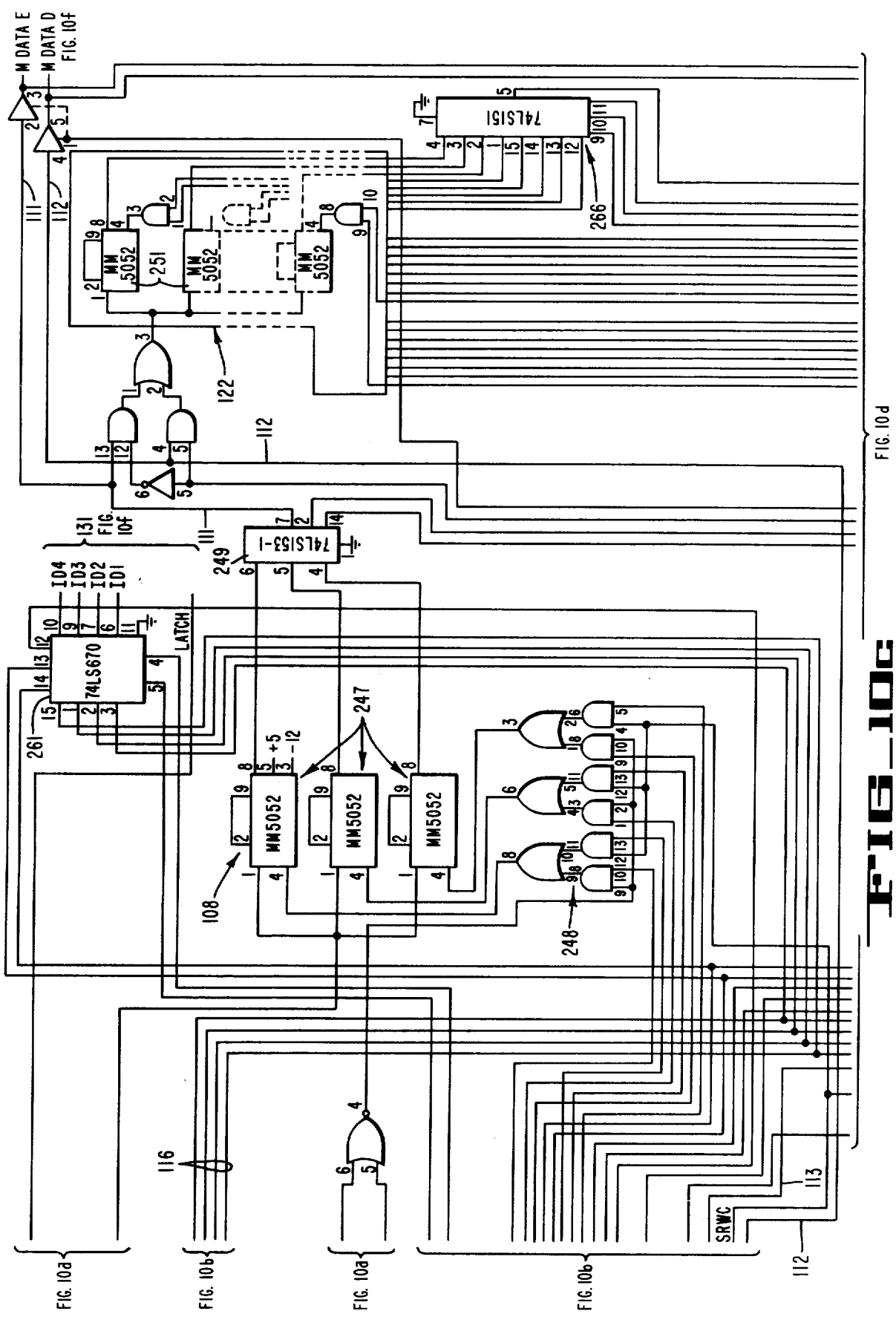

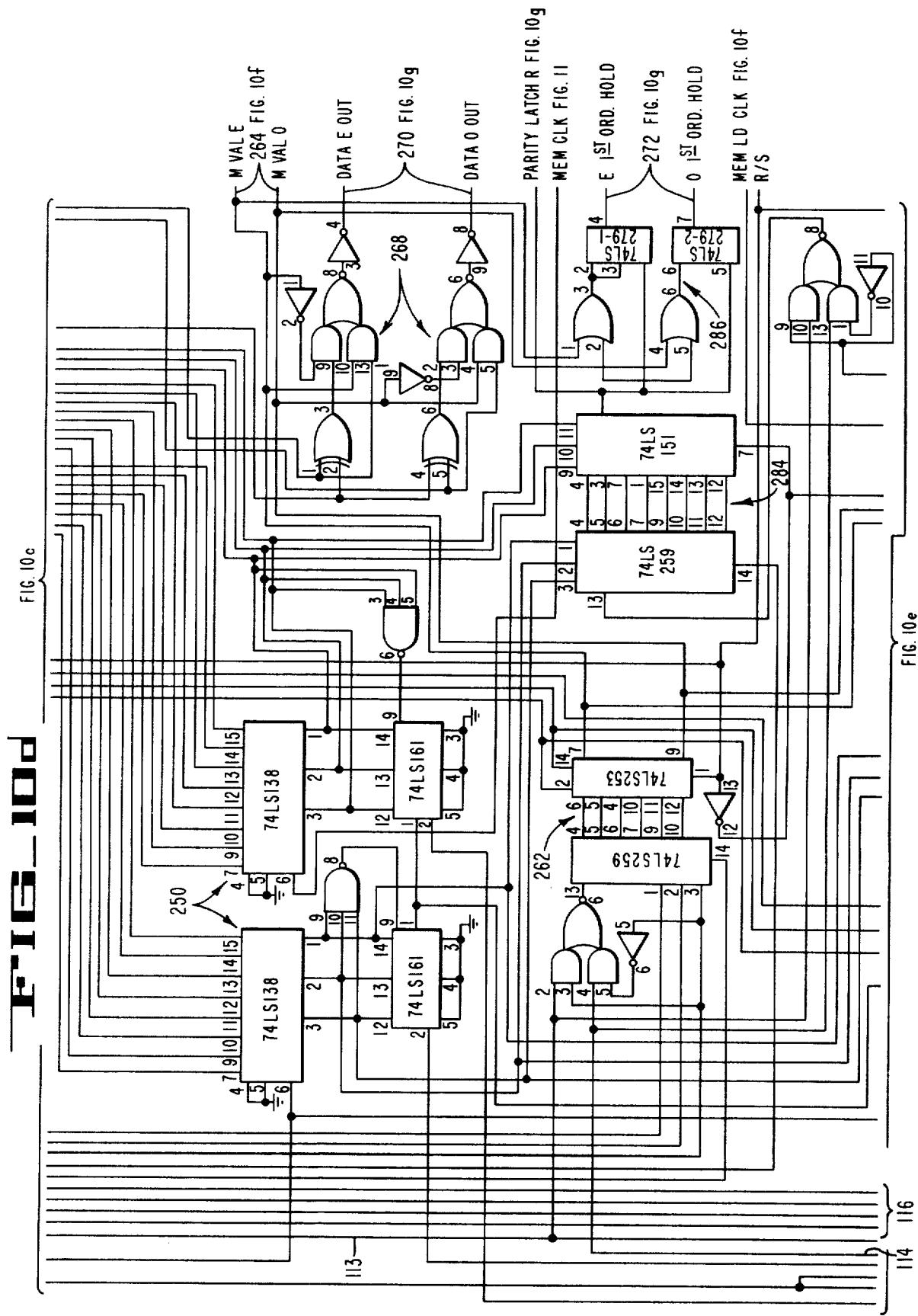

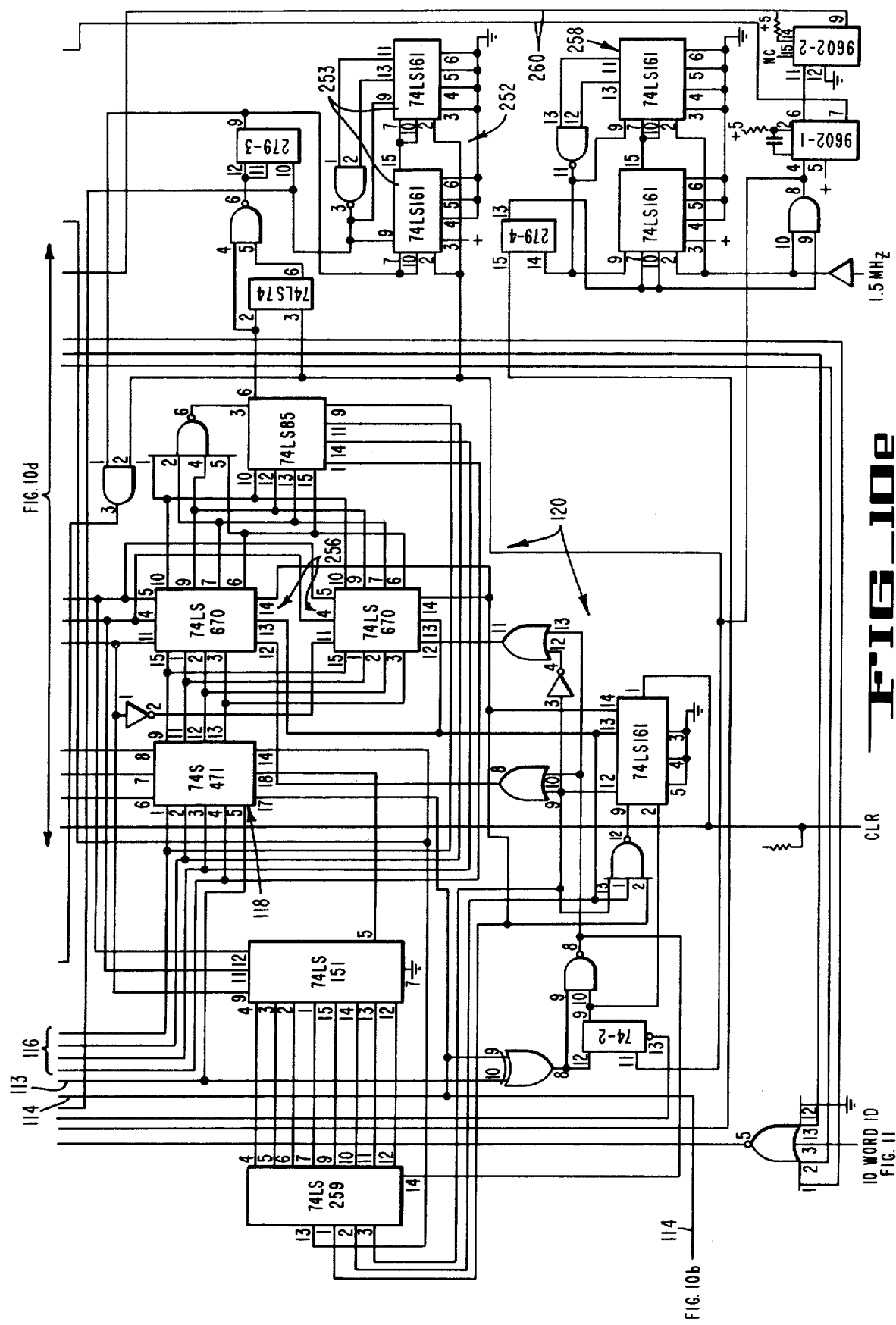

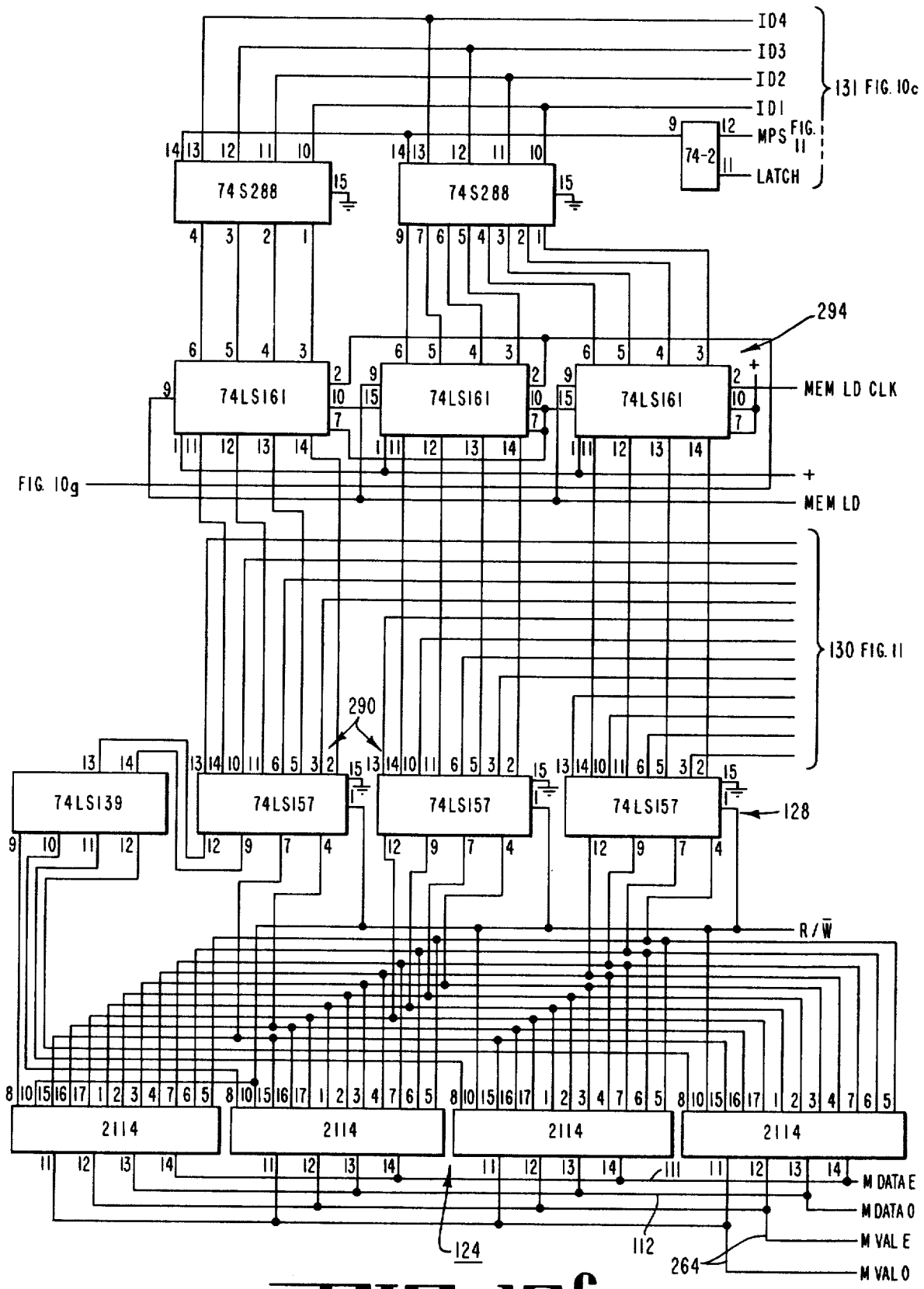
FIG_10f

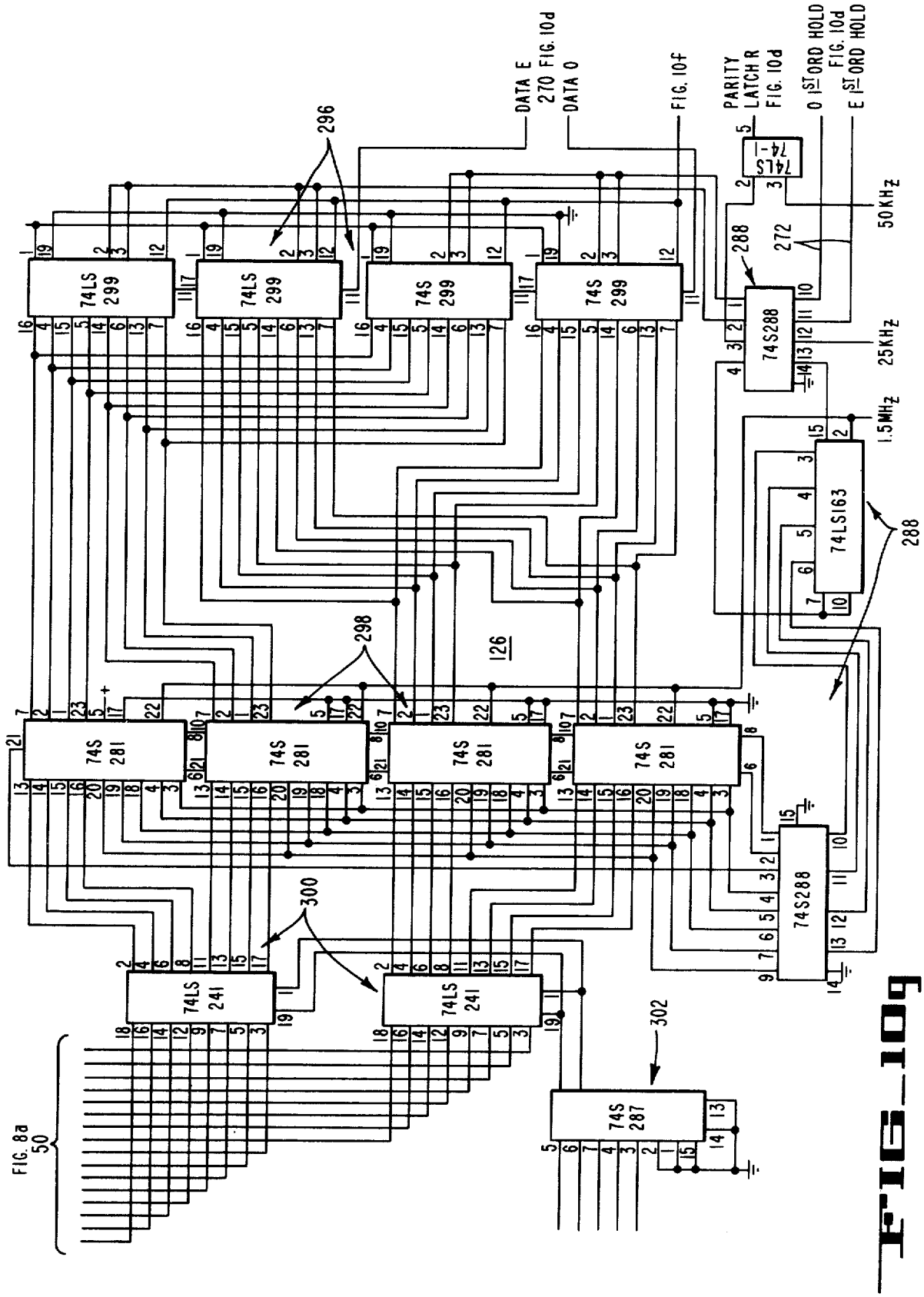

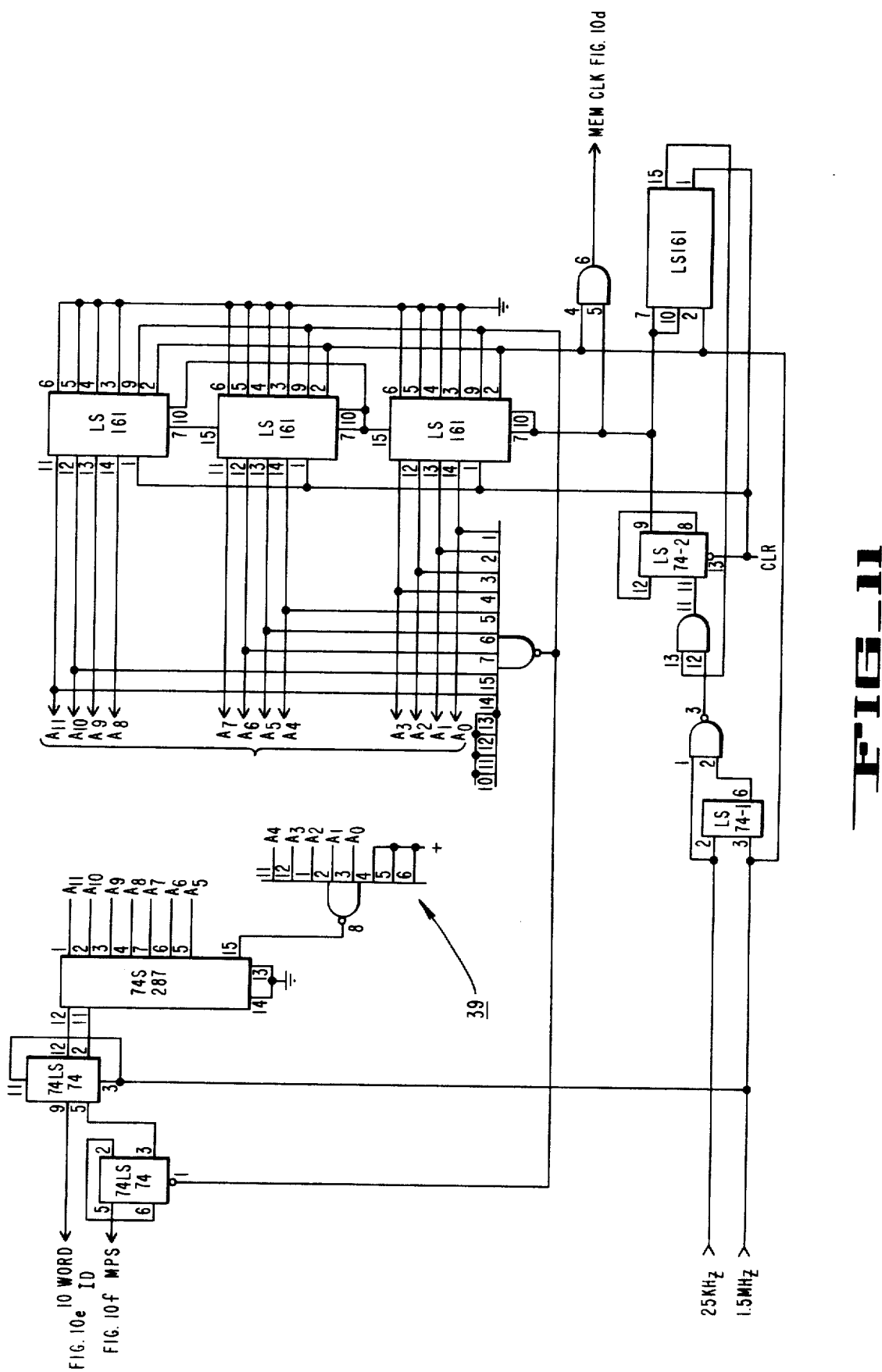
FIG_11

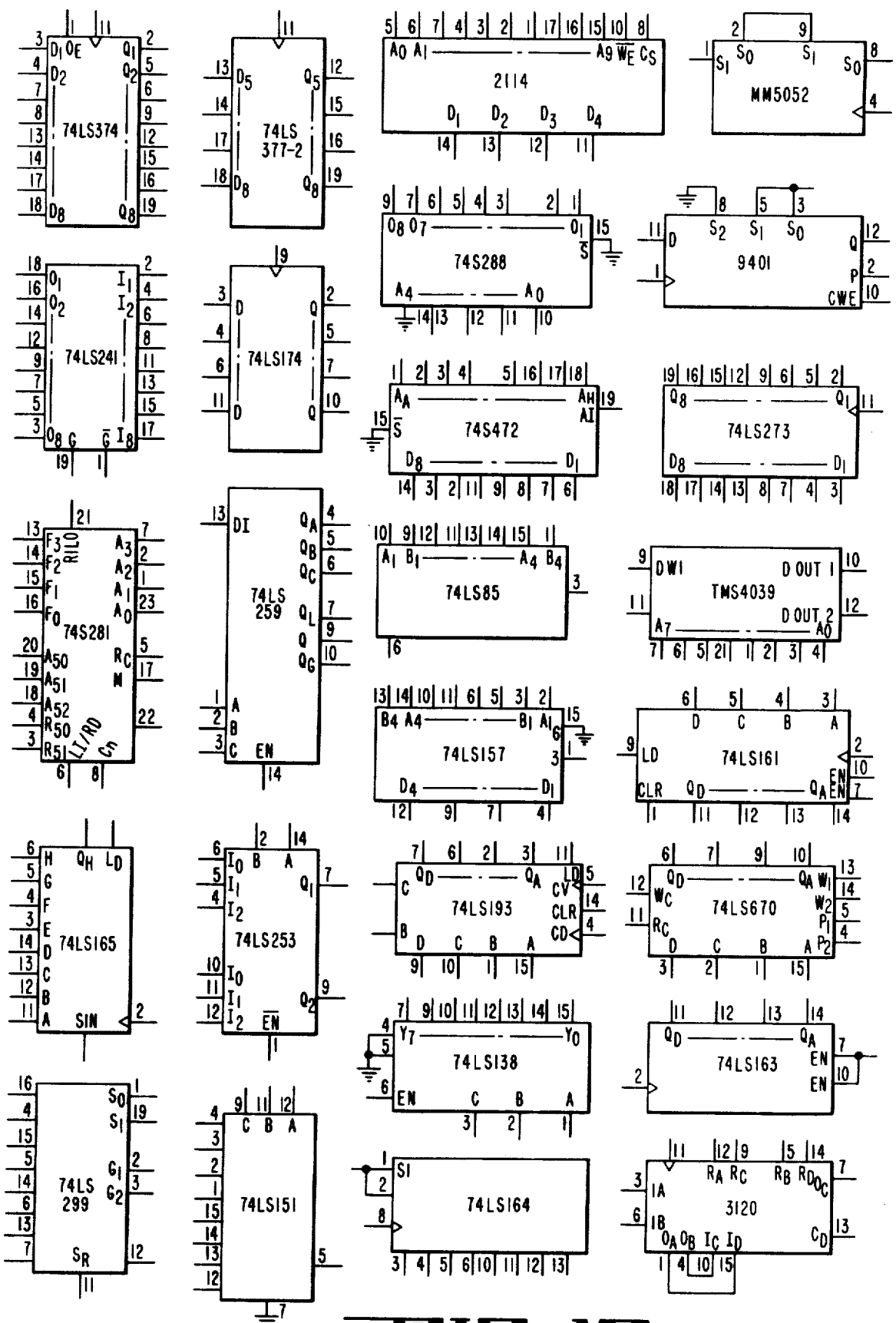
FIG_12

METHOD AND APPARATUS EMPLOYING AN IMPROVED FORMAT FOR RECORDING AND REPRODUCING DIGITAL AUDIO

BACKGROUND OF THE INVENTION

1. Field

The invention relates to the recording and reproduction of digital audio, and particularly to an improved digital audio format, and method and apparatus thereof, for digitally recording and retrieving audio signals with error correction and concealment techniques.

2. Prior Art

As commonly known, the use of digital techniques has spread rapidly due to the ease with which digital data can be manipulated, transferred, transmitted and stored. Accordingly, as has happened in various technical fields such as the computer, instrumentation and video recording fields, digital techniques have recently acquired significant potential in the field of recording and reproducing of audio signals.

The object of any recording process is to store information and then faithfully reproduce it. However, in conventional analog recorders there exists a number of problems which deteriorate faithful reproduction, which problems are an inherent function of the recording medium and of the mechanical apparatus used to transport the medium. Although the problems have been compensated, or circumvented, by the development of very sophisticated mediums and mechanics, it is widely recognized that conventional analog recording-/reproducing techniques are rapidly approaching theoretical operational limits.

Typical of problems encountered in analog recording/reproducing techniques are inadequate dynamic range, i.e., low signal-to-noise ratio, inherent phase distortion, inherent harmonic distortion, insufficient transient response, modulation noise, cross talk, print through, multi-copy degradation, flutter and wow, inherent limitations in noise reduction systems, storage degradation with time and limited low-end frequency response.

On the other hand, digital recording/reproducing techniques provide either an improvement in, or total elimination of, each of the above problems. Some of the problems, such as modulation noise, print through, inadequate dynamic range, harmonic distortion, modulation noise and low end limitations, are eliminated or significantly improved due to the fact that the problem does not exist in the digital domain. Other problems, such as phase distortion, transient response, flutter and wow, and storage and multi-copy degradation, are eliminated or significantly improved due to the ease with which the signal can be handled once it is converted to the digital domain.

However, the use of digital audio techniques in turn gives rise to various problems and disadvantages. For example, poor transmission conditions that conventionally would only degrade an analog signal may completely destroy the equivalent digital signal, and even a small discontinuity such as a single bit error, may cause serious audio degradation and unpleasant sounds if the bit error occurs at a significant bit position. That is, digital signal systems characteristically fail abruptly, usually without the gradual warning which is typical of deterioration in analog systems. Thus, it has been found that digital audio techniques require the use of special error correction, concealment and/or muting techniques to minimize the effects of the various types of dropouts and data errors arising during the reproduction of the recorded digital audio.

In order to effect efficient correction and/or concealment of errors, it is first necessary to detect that an error has occurred. A first level of error indication is provided by observing the playback RF signal envelope. However, such a technique fails to provide the requisite degree of detail required for a reliable error detection system.

Thus, in a high performance digital audio system, an optimum error detection technique includes the process of recording additional information along with the normal audio signal data. This information, termed "overhead", may be in the form of parity bits and/or special error checking characters, which are capable of providing detection of any error which may occur during the record or playback processes.

Upon detection, the errors may be either concealed and/or corrected. Concealment techniques may employ a zero order interpolation concealment where the last accurate data sample is held, or a first order interpolation concealment where an interpolation is made between the last accurate data sample and the next occurring accurate data sample.

The most desirable technique for eliminating errors is to correct them. This requires knowledge of the data recorded during the time that the error occurred. Thus, error correction techniques require the addition of the overhead information of previous mention during the recording process. Since errors generally are not randomly scattered but exist in bursts lasting from a few to several hundred bits, the error correction information must be dispersed and recorded on the recording medium to prevent the burst type errors from precluding precise operation of the error correction system. Thus, it follows that the more effectively and reliably that an error concealment and correction technique is, the more overhead information must be added to the audio data during recording. This additional overhead increases the data storage requirements of the recorder and either increases the packing density on the medium or causes a corresponding undesirable increase in tape speed and usage.

Thus, the method and format used to intersperse the overhead information with audio data is important in providing error concealment or correction of a gradual deterioration of the recorded data bit stream while precluding the total failure of the correction and thus of the digital audio recorder/reproducer system.

A fairly comprehensive list of articles on digital audio recorder/reproducer systems is compiled in the list of references and bibliography of an article by M. Willcocks entitled "A Review of Digital Audio Techniques", Journal of The AES, Jan-Feb, 1978, Volume 26, pages 56-64. Typical of such prior art are the systems described in Bellis & Brookhart AES preprint no. 1298 (M-2) Nov. 4-7, 1977; BBC Research Department report, Bellis and Smith BBC RD 1974/39, Nov. 1974; N. Sato, "PCM Recorder, A New Type of Audio Magnetic Tape Recorder", Journal AES, V. 21, No. 7, Sept. 1973; U.S. Pat. No. 3,930,234 to Queisser, et al; U.S. Pat. No. 3,994,014 to S. G. Burgiss.

SUMMARY OF THE INVENTION

Accordingly, it is an object of the invention to provide an improved error concealment and correction method and apparatus for a digital audio recorder/reproducer.

Another object is to provide an improved digital audio data format for a digital audio error concealment and correction system.

A further object is to provide an improved digital audio data format wherein the digital data is selectively interspersed with error detection, correction and synchronizing information in a given block/sub-block configuration.

Still another object of the invention is to provide an improved digital audio data format uniquely applicable to automatic error correction and to manual and/or automatic editing techniques.

To this end, the invention provides an improved format, method and apparatus for interspersing audio data, sync and error detection and correction information which circumvents the problems and disadvantages presently existing in the prior art digital audio record/reproduce systems mentioned above. The recorded data is formatted into blocks with selected inter-block gaps to allow going into, and out of, the record mode without irretrievably destroying data. Each block is independent of all others, and is divided into a selected arrangement of sub-blocks of data and sub-blocks of parity information, wherein each sub-block contains its own error detection and sync information. In addition, the blocks of data corresponding to the data stream, and the error and sync information, i.e., overhead, are simultaneously recorded in alternate tracks on the recording medium to further enhance the efficiency and accuracy of the error detection and correction technique relative to those of the prior art.

In an exemplary embodiment, the digital audio data in each successive block is divided into thirty sub-blocks, each containing its own error detection, correction and sync information. Twenty alternate 16 bit samples from the audio waveform are placed into two of these (data) sub-blocks, which are then used to generate a third (parity) sub-block which may be the bit-by-bit parity of the first two data sub-blocks. By way of example, parity may be generated by adding two data words together in modulo-2, or by adding the two data words as the 2's complement. In either case the result is a data "triad" where even numbered samples are in one sub-block, odd numbered samples are in another, with the parity information in the third sub-block. The three sub-blocks, or "triad", are then specifically dispersed, along with the other 27 sub-blocks, to define the major block. In addition, the data sub-blocks of a triad are then simultaneously recorded along alternate tracks in the recording medium while the parity sub-block of the triad is divided and recorded in both tracks following the respective data sub-blocks. Such a block/sub-block arrangement generally prevents any one error event, such as dropout or burst errors, from causing errors in more than two of the sub-blocks in any data triad. If an error occurs during playback in one of the three sub-blocks in a data triad, the original data in that sub-block is correctly re-constructed from the remaining data and the parity sub-blocks in accordance with the error correction technique. If an error occurs in two sub-blocks, error masking or concealment techniques are used to mask the error.

BRIEF DESCRIPTION OF THE DRAWINGS

FIGS. 1A, 1B and 1C are pictorial representations of an electrical process used to format the basic audio data.

FIG. 2 is a pictorial representation of an embodiment of the block/sub-block format of the invention.

FIGS. 3A, 3B and 3C are pictorial representations of the arrangement of the data and parity sub-blocks, and of the inter-block gap (IBG), respectively.

FIGS. 4 and 5 are pictorial representations of the format of FIG. 2 depicting the manner of re-generating (correcting) data sub-blocks, and of interpolating (concealing) a data sub-block, respectively, in the event of dropouts.

FIG. 6 is a block diagram of a digital audio recorder/reproducer system embodying the method and apparatus of the invention combination.

FIG. 7 is a more detailed block diagram of the portions of the system of FIG. 6 which depict the apparatus for generating the format of FIG. 2 while recording and reproducing audio data.

FIGS. 8A, 8B, 8C and 8D are schematic diagrams exemplifying one implementation of the formatter encoder of the system of FIG. 7.

FIGS. 9A and 9B are schematic diagrams exemplifying one implementation of the format controller for controlling the system of FIG. 7.

FIGS. 10A, 10B, 10C, 10D, 10E, 10F and 10G are schematic diagrams exemplifying one implementation of the decoder/de-formatter of the system of FIG. 7.

FIG. 11 is a schematic diagram exemplifying one implementation of the read address controller for the system of FIG. 7.

FIG. 12 is a pictorial view depicting the layout, pin numbers, etc., of various integrated circuits used in the schematics of FIGS. 8-11.

DESCRIPTION OF THE PREFERRED EMBODIMENTS

Figure 8C:
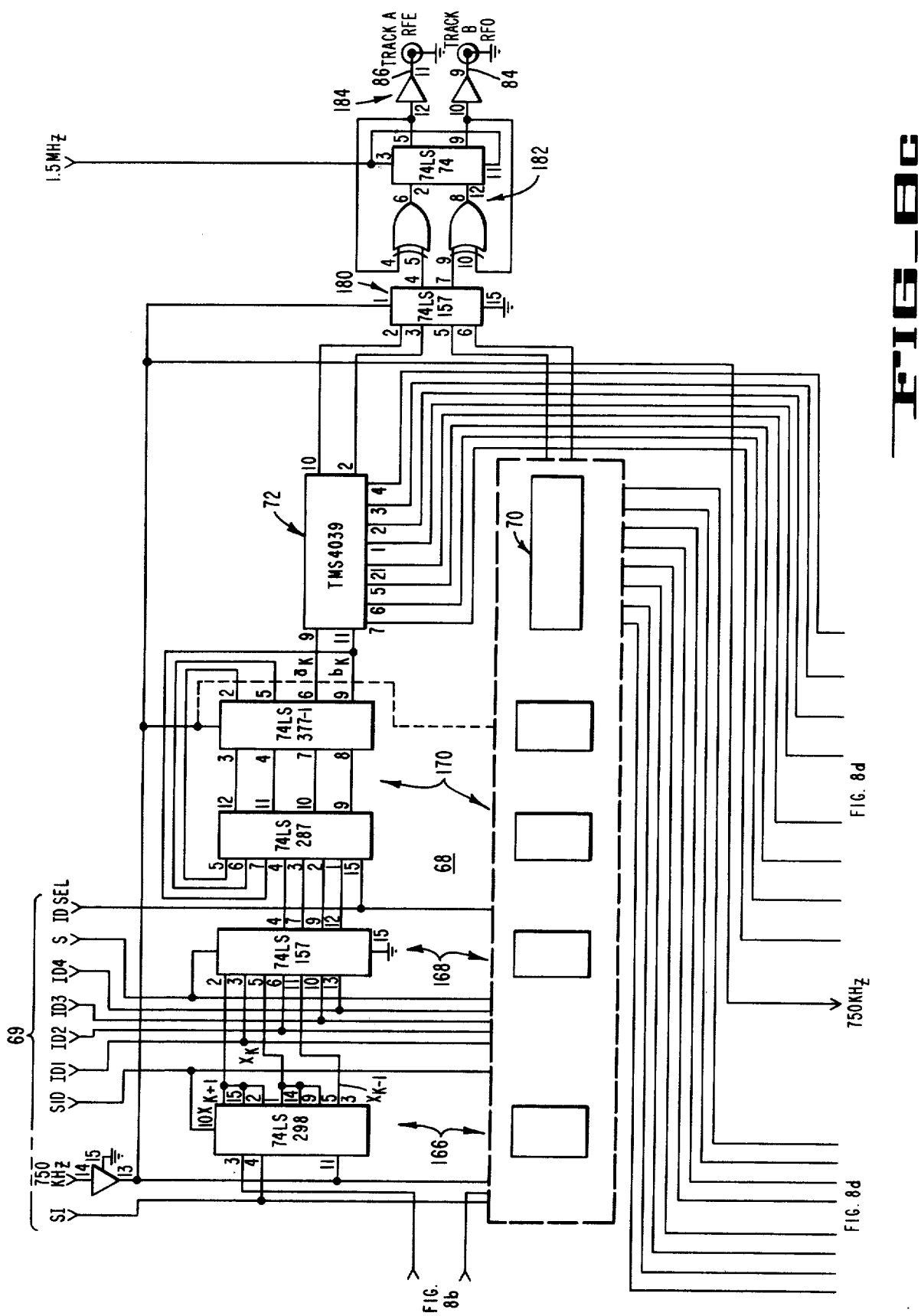

It has been found that a digital audio recorder format must provide, among other requirements mentioned above and further described below, the capability of handling manually-directed machine edits, such as punch-ins, as well as edits directed by an automatic system. That is, the entrance and exit points of edits must not irretrievably destroy or disturb existing data adjacent the data boundaries. Thus, the invention formats the recorded data into blocks which are independent from all other blocks, with well defined inter-block gaps therebetween which provide the entrance and exit points. The blocks in turn are formed of a selected plurality and arrangement of sub-blocks of audio data interspersed with sync and error detection and correction information. The arrangement of three sub-blocks is herein termed a "triad".

In accordance with the invention, each block is physically long enough, on the recording medium, to allow proper dispersion of the data within the block such that dropouts cannot destroy the error correction mechanisms of the system. Further, the blocks occur often enough such that there are at least two blocks on the medium between the positions of the reproduce and record heads. The latter condition provides the capability of electronic cancellation of real and apparent variations in head-to-head spacing due to mechanical tolerances, including machine-to-machine interchange, and tape dynamic characteristics. It also allows time for the processing of the data contained in a block, either within the recorder or in a peripheral electronic processor, for subsequent re-recording into the same block space as it passes the record head. This maintains absolute timing between channels of a multi-channel recorder during editing procedures.

In the present embodiment, by way of example only, for a tape speed of 30 inches per second (in/s) a block rate of 250 Hertz was selected in view of limitations imposed by the need to have simple synchronization relationships with the various world television and film standards. The rate provides an on-medium block-to-block pitch of 120 mils and an inter-block gap of 9.6 mils. In the present example, five blocks occur between the reproduce and record heads, which equals a spacing of 600 mils.

Since it is possible that a major dropout will cause the data retrieving electronics to lose sync, it is necessary to regain sync as soon as possible to minimize the additional loss of data. Thus, the minimum frequency of sync occurrence is related to dropout length probability. However, the maximum frequency of sync information occurrence is decreased by the need to minimize the amount of overhead added to the recorded data. In the instant embodiment, the format repeats the 12 bit sync information approximately every 0.25 milliseconds (ms).

It is also necessary to quickly and un-ambiguously detect the data errors resulting from dropouts. The format herein repeats error detection information at the same 0.25 ms rate as the sync information. The error detection information herein is in the form of a cyclic redundancy check character (CRCC) pattern which yields excellent error detection characteristics with the addition of only 12 detection bits for every 172 bits which are to be protected.

The format is arranged to provide error masking and concealment, as well as error correction capabilities. The error correcting technique always corrects errors in a data triad when those errors are contained within one sub-block of the triad. If the errors are contained within two sub-blocks and the remaining good sub-block of the triad contains sampled audio data, the errors are masked or concealed in a very effective manner by interpolating between the alternate data samples contained in the good sub-block. This is generally termed first order interpolation concealment. When both of the sub-blocks in a triad which contain sampled audio data have errors, concealment using data holding or muting is performed, where the value of the last good data sample is held until the next good sample. This is generally termed zero order interpolation concealment. An alternative to zero order interpolation is muting during uncorrected errors.

In the embodiment described herein, by way of example only, the sampling rate of the audio signal is 50 kHz. The format provides a 16 bit word to represent each data sample, whereby the basic serial audio data rate is 800 kilobits per second (kb/s) per channel. To provide error correction, the added overhead is 50% of the basic data rate, and error detection and synchronization requires an additional 16% of overhead. The inter-block gap configuration requires an additional 8.7% overhead, resulting in a total data rate per channel of 1.5 megabits per second (mb/s).

In order to allow recording such a data rate at conventional medium speeds of, for example, 30 (in/s), the system herein divides the audio data stream into two paths which then are recorded into two separate tracks on the medium. This allows the use of a recording speed of 30 ips with an acceptable recorded bit density of 25 kb/in, considering currently available recording media.

More particularly, in discussing the digital audio format of the invention combination, and particularly the generation thereof, FIG. 1 depicts the electrical process used to initiate the format of the basic audio data in real time. An analog-to-digital (A/D) converter, either within the recorder as depicted in FIG. 6 below, or peripheral to the system, samples the incoming audio signal every 20 microseconds (50 kHz) and generates a 16 bit binary number representing each sample. FIG. 1A represents the continuous generation of the 16 bit binary numbers representing the consecutively sampled audio signal. To aid the explanation, the numbers are consecutively numbered from S1 through S20, which represent the first in a series of 20 samples. The first sample S1 is placed in an odd sample sub-block, O-1 of FIG. 1B. The second sample, S2, is placed in the even data sub-block, E-1 of FIG. 1B. Likewise, the sample S3 is placed in odd sub-block O-1, the sample S4 is placed in even sub-block E-1, and the sampling continues until all 20 samples have been divided between odd and even sub-blocks O-1 and E-1, respectively. Each data sample contains 16 bits, and each sub-block contains 10 samples, whereby accordingly each sub-block contains 160 bits of digitized audio data.

A third sub-block, termed the parity sub-block and shown in FIG. 1C, is created by sequentially comparing the bits in data sub-block O-1 with those in data sub-block E-1. For example, the first bit in O-1 is compared with the first bit in E-1. As known, binary bits can have only two values, a "1" or a "0", whereby if both bits compared are of the same value, a "0" is placed in the first bit position of the word in parity sub-block P-1. If the bits have a different value, a "1" is placed in the first bit position of the word in parity sub-block P-1. Such process continues on a bit-position by bit-position basis until all 160 bits of audio data have been compared and all 160 positions within parity sub-block P-1 have been filled. The result is a sub-block triad consisting of two data sub-blocks O-1, E-1 and parity sub-block P-1.

The next 20 samples are also divided into a triad configuration such as shown in FIGS. 1A–1C, whereupon ten of the triads are then combined to form a single data block.

Although parity is generated above employing a modulo-2 addition, parity may be obtained by the 2's complement addition. Thus, two words are summed, and the 2's complement sum is formed; i.e., there is formed a 17-bit word which represents the 2's complement sum of the two sixteen bit words. Then the most significant sixteen bits are recorded as parity. In reproducing the data, the top sixteen bits are retrieved and subtracted from parity, whereby the least significant bit is not derived, i.e., in the event of an error, only the first fifteen bits of the missing data word are recovered. However, this technique provides a more accurate masking technique than when using the modulo-2 addition to generate parity, since the parity may be divided by two to yield a fifteen bit approximation instead of a linear interpolation.

Referring to FIG. 2, the ten sub-block triads that make up one data block are divided between alternate recording medium tracks, track A and track B. The tracks are spaced apart on the order of one track width to insure that typical single event dropouts only affect one track of the two track pair.

Track A contains the odd data sub-blocks (O-1, O-2, etc.) and track B contains the even data sub-blocks (E-1, E-2, etc.). Thus, it may be seen that alternate samples of the audio signal as sampled in FIG. 1 are recorded in alternate tracks of the recording medium.

Note that the parity sub-blocks are shared between the tracks, with the odd parity sub-blocks (P-1, P-3, P-5, P-7 and P-9) recorded on odd track A, and with the even parity sub-blocks (P-2, P-4, P-6, P-8 and P-10) recorded on even track B. Such an arrangement of parity sub-blocks improves the accuracy of error correction as is further explained hereinbelow.

The data block of FIG. 2 also depicts the inclusion of synchronization and error detection information at specific locations within the block, and particularly at specific locations within each sub-block. As previously mentioned, it is possible that when a major dropout occurs, the recorder's electronics may lose synchronism with the format on the recording medium. Synchronism must be regained as soon as possible to minimize any additional loss of data. To ensure this rapid recovery, a 12 bit pattern is inserted at the beginning of each sub-block as depicted in expanded detail of specific sub-blocks along the bottom of the FIG. 2. This pattern is unique and cannot naturally occur in the audio, parity or error detection data. By way of example, an encoding scheme may be used wherein the synchronization pattern may comprise a self-clocking, DC free pattern of seven bits which does not occur in data, with a five bit suffix to indicate which sub-block is under consideration. An example of an encoding scheme which may be used is the Miller squared ($M^2$) type code. It may be seen that a synchronization pattern occurs approximately every 0.25 ms.

Just as it is necessary to re-synchronize after a dropout as soon as possible, it is also necessary to quickly and unambiguously detect the data errors resulting from dropouts. Obviously, it is only after detection of a dropout error that such errors may be corrected to concealed. Accordingly, a 12 bit error detection character is added to the end of each sub-block and thus occurs at the same rate as the synchronization pattern. This character is in the form of a cyclic redundancy check character (CRCC), which character is the result of arithmetically dividing the data in the sub-block by a binary polynomial. More particularly, the CRCC is a code wherein the data stream is successively divided, i.e., the 160 bit of a sub-block are divided by a selected polynomial employing a modulo-2 scheme. The number is subtracted and is shifted to the right, subtracted again, and again shifted to the right. This results in a remainder much as in the process of long division, which is stored as the CRCC code. Since the polynomial used to generate the remainder character when the data was received is known, the division may be performed again in playback, whereupon the check characters may be compared to provide error detection. If the remainder from this division matches the remainder represented by the CRCC, there is an extremely high probability that no errors occurred during playback in either the data or the CRCC. If the check characters are not the same, then it is known that an error has occurred in the block of information. If an error burst occured and that burst was less than 12 bits in length, the errors will be unconditionally detected. If the burst error is exactly 12 bits long, the probability of the error going undetected is 1 in 2,048. For burst errors longer than 12 bits, the probability of undetected errors is 1 in 4,096. Thus, it may be seen that the scheme provides a potential to improve the recorder's basic bit error rate by 5,000 to 1 if all detected errors are corrected.

The data block of FIG. 2 further includes a selected blank space or inter-block gap (IBG) at the beginning of each block of data, which gap is reserved for the nonrecording of information. More particularly, in the embodiments herein described, the IBG contains only transitions relating to clock extraction, and physically separates the data into blocks to allow the digital audio recorder to enter and exit the magnetic history on the recording medium during the recording, editing, etc., processes without irretrievably destroying the recorded audio data. The IBG may be used to supply total block information, editing information, etc.

The block/sub-block configuration of the instant format, wherein the blocks are separated by inter-block gaps, allows a unique reproduce/record head configuration and method of operation, which, in turn, provides unique advantages not available in prior art audio recorder/reproducers. That is, in the digital audio system described herein, the reproduce head is located first or upstream on the tape, and the record head is spaced therefrom down the tape or downstream from the reproduce head. More particularly, the reproduce head is spaced ahead of the record head a distance of five blocks, i.e., 600 mils, and a delay circuit is provided which has a delay equal to the distance between the heads. Such a configuration allows the information to be reproduced and subsequently recorded in the same position on the tape as long as the exact distance between the heads is known. Likewise, the configuration allows the system to drop into record at the center of the inter-block gap, and allows dynamically varying the length of the inter-block gap in order to make certain that all the gaps are of the same length. Additionally, in editing, the magnetic history on the recording medium can be reproduced from the medium, processed, corrected, etc., and then replaced on the medium by the record head in exactly the same position at which it was initially recorded. The circuit of the application (FIGS. 7-11) provides for dynamically varying the delay distance (between the heads) such that the reproduced data in one signal channel may be processed in one manner, while the data in another signal channel may undergo a different type of processing.

As may be seen in FIG. 2, the improved format hereof provides a minimum distance between the data sub-blocks and the parity sub-blocks, which improves the error correcting capabilities of the system. Since most tape dropouts are 10 mils or less in length, the CRCC codes located at the end of each sub-block are approximately 7¼ mils apart. This allows the system to rapidly recover after a dropout, which in turn allows recovery of the data and synchronization. The parity blocks should thus be greater than 10 mils apart, and they are located within the format described herein a minimum of 30 mils from the respective data that they protect. Such arrangement optimizes the chances of surviving catastrophic type dropouts that might occur such as, for example, if there are fingerprints or dirt on the tape, manufacturer's defects, etc. The rate of occurrence of the inter-block gaps is also selected to allow for synchronization to any of the television broadcast standards, i.e., NTSC, PAL, etc.

FIGS. 3A, 3B, and 3C show the construction of the data and parity sub-blocks, and the inter-block gap, respectively, in greater detail. The data sub-block of FIG. 3A includes ten audio samples of 16 bits each, is preceded by the sync code and is followed by the cyclic redundancy check character. The parity sub-block of FIG. 3B is similar to that of the data sub-block, and includes parity for 20 audio samples of two data sub-blocks, wherein the combination of two data sub-blocks and the associated parity sub-block defines the "triad" of previous mention.

The inter-block gap of FIG. 3C separates the data blocks and is used to go into and out of record without destroying audio data. The IBG also contains the synchronization pattern preceding the gap which identifies it as an IBG, and the cyclic redundancy check character for error detection following the gap. The IBG may be utilized to record non-critical and generally repetitive information such as time code, data block identification, or editing information. Thus, the IBG may be used, for example, to label each specific block of data for editing purposes whereby determination may be made in terms of hours, minutes, seconds, frames and then blocks. This allows the system to detect a specific block, whereupon the system may count down inside the block and perform, for example, an edit within the block on a word-by-word basis.

Such format allows the advantage of non-destructive recording which precludes muting of the signal during times in which some sort of edit is completed, and it allows for an instantaneous data transfer. That is, when moving from one sample to the next sample, the system can select the next sample from a source which is different from the sample source which would normally be used. Thus, it follows that the limit of resolution is down to the sample rate which is 20 microseconds in the instant configuration as opposed to the delay times on the order of several milliseconds for prior art digital audio recorders.

For any professional recording format to be acceptable and practical, its error correction mechanism must survive the typical data dropouts that occur during playback. The format described herein is designed such that the vast majority of dropout occurrences do not harm more than one sub-block in a (three) sub-block triad. Additionally, the format configuration has small probability that multi-dropouts will disturb more than two sub-blocks within the triad.

To illustrate error correction and concealment techniques, FIG. 4 shows a simplified format configuration with tracks A and B, and includes the three sub-blocks of a triad dispersed on the magnetic tape and defined by two data sub-blocks and a shared parity sub-block. If a dropout causes errors in, for example, the 0-1 (odd-1) and 0-2 (odd-2) sub-blocks of the triad, the respective even data sub-blocks and the associated parity sub-block of that triad are used to absolutely regenerate the data that was in the odd data sub-blocks 0-1 and 0-2. Thus, as depicted by the arrows, a dropout in odd data sub-block 0-1 is corrected by utilizing the information in even data sub-block E-1 with the parity sub-block P-1 to provide a reconstructed odd data sub-block 0-1. Likewise, a dropout in 0-2 sub-block is corrected by utilizing the data from even sub-block E-2 with the parity sub-block P-2 to reconstruct the odd data sub-block 0-2. Such correction techniques represent the vast majority of error occurrences and results in complete error correction.

However, if two separate dropout occurrences cause errors in both a data and parity sub-block of a triad, i.e., data sub-block E-5 and parity P-5 as shown in FIG. 5, the samples in the remaining data sub-block 0-5 are used to interpolate between the best samples to define data E-5, since there are not enough data available to fully reconstruct the damaged data sub-block. The result is a very good approximation, i.e., error concealment, wherein the concealment is first order if an interpolation between adjacent samples is made, and is zero order if the last good sample is held until the next good one. Listening tests with concealment of errors representative of this format have shown that skilled listeners find it extremely difficult to detect deliberately repetitive interpolative concealment even when the occurrence thereof is precisely known. In addition, because the data is separated into two tracks, it permits continuous linear interpolation with the remaining samples, a more acceptable situation than the complete loss of an entire channel of audio.

FIG. 6 depicts in block diagram a digital processor 12 which generates and retrieves the improved format configuration of FIG. 2, and which forms a part of the overall digital audio recorder/reproducer system. The analog audio signal is applied to terminal 14 and to an input line amplifier 16 which is generally of conventional design except for the requirements of exceptional dynamic range. The output of the line receiver is applied to an input filter 18, which is a sharp cut-off low pass filter, with the cut-off at the highest frequency to be recorded. The filter 18 prevents the generation of aliasing products when the audio signal is sampled. The filtered audio signal is fed to a sample/hold network 20 which samples the analog waveform at the input filter, and further holds the sampled value of the audio waveform constant while an A/D converter 22 is converting that value to a digital word. The output of the A/D converter 22 is typically in parallel form where the bits which make up the binary word are available simultaneously. After each sample interval, this parallel binary word changes to represent the value of the next sample.

The sampled digital words are then introduced to a formatter 24 of the digital processor 12 which converts the parallel binary word into a serial NRZ data stream for recording on the magnetic recording medium. An additional purpose of the formatter 24 is to add other types of data to the serial bit stream as depicted at input line 26. This additional data or overhead, consists of the bit patterns for synchronization and sub-block identification, the cyclic redundancy check characters, and the error correcting codes or parity characters, of previous mention.

In addition, the formatter 24 includes a channel encoder 28 which compensates for the lack of DC response of the NRZ data if it were to be directly recorded on a medium, by encoding the NRZ data into a form which minimizes, or has no, DC response and has a spectral content which matches the record channel. By way of example only, the encoding scheme may be the Miller squared ($M_2$) code, or other similar code, which is self-clocking and DC free. The output of the channel encoder 28 is directly connected to a record interface 30 which includes the record amplifier and driver for recording the digital data on a recording medium 29 via the record head or heads 31.

As depicted in FIG. 6, a format controller 29 generates various specialized pulses and waveforms which are required to control the formatter 24 and encoder 28, as further described below.

In the reproducer portion of the digital audio system, the signal from the reproduce head or heads 33 is applied from the recording medium 29 to a low noise, wide bandwidth preamplifier, and thence to a reproduce equalizer both of which form a reproduce interface 32. As previously mentioned, the reproduce head is spaced upstream from the record head 31 a precise distance, which herein is equal to 600 mils or five blocks of the format. The equalizer of the reproduce interface 32 adjusts the amplitude and phase response such that zero crossings in the waveform of the reproduced binary signal closely represent the zero crossings in the waveform which was recorded. The output from the interface 32 is fed to a bit synchronizer/limiter 34 which generates a TTL compatible digital data waveform corresponding to the coded NRZ data recorded on the medium, and extracts the data clocking frequency from the reproduced digital data. This is the same clocking frequency that was used originally to generate the channel code. The limiter limits the positive and negative voltage excursions of the reproduced data.

The output from the bit synchronizer/limiter 34 includes the reproduced digital data and the data clock. These are simultaneously applied to a channel decoder 36 of the digital processor 12, which decodes the NRZ information and applies it to a deformatter/TBC/error detector/corrector 38 also of the digital processor 12.

The function of the de-formatter portion of block 38 is to separate the basic binary audio data from the overhead information which is largely a process of serial-to-parallel conversion. The time base correction circuitry electronically cancels wow and flutter components by correcting the timing of each playback sample, and also serves to deskew all channels of a recorder to ensure phase congruity from channel to channel. One output from the de-formatter is the original binary audio data, and another output is the overhead information which is used in the error detector and corrector portion of the same block 38. In the error detector, the basic audio data and overhead data are analyzed to determine whether an error has occurred. If there has been an error in the audio data, the correction data is used to correct the error. The output of the error detector and corrector is a series of parallel binary (16 bit) words which should be error-free and a replica of the data that was generated by the A/D converter 22.

As depicted in FIG. 6, a read address circuit 39 generates address control signals which are required to control the readout of the data from an output memory of the de-formatter/TBC/error detector/corrector 38, as further described below.

The output from the de-formatter/TBC/error detector/corrector 38 is introduced to a D/A converter 40 which converts the binary words to sequential analog voltage levels. An output sample and hold circuit (not shown) of the D/A converter 40 holds the voltage levels constant during which sample period to eliminate major settling glitches in the D/A converter. The output of the D/A converter 40 is applied to an output low pass filter 42 which removes the sampling frequency and its sidebands which appear as images of the audio signal. An output analog audio signal is generated on output terminal 46 via an output line amplifier 44 which also requires an exceptional dynamic range.

Referring now to FIG. 7, there is shown in greater detail the digital processor 12 of FIG. 6, wherein is generated and recovered the improved format of, for example, FIG. 2. The formatter 24/encoder 28 employed in the record, edit, etc., processes is shown along the upper half of the page of FIG. 7, whereas the decoder 36/de-formatter/TBC/error detector/corrector 38 of the reproduce process is shown along the lower half. The parallel data words from the A/D converter 22 of FIG. 6 are applied via a bi-directional bus 50 to an input latch/parallel-to-serial converter 52 which converts the data stream from a parallel to a serial data stream at a higher data rate. The block 52 also provides a variable delay in response to a record delay memory 54 to compensate for the distance between the reproduce and record heads, plus any editing delays which may be inserted into the digital data cycling loop. The digital data cycling loop includes the recording medium 29, the reproduce and record heads 31, 33, the digital processor 12 and the bi-directional data bus 50 (FIG. 6 also). The record delay memory 54 therefore may be controlled via a variable editing delay control input on line 56. Thus, for example, if the digital data signal is to be reproduced from and re-recorded in the recording medium in the process of performing an edit, correction, etc., function, there are time delays during processing the information, which delays are accommodated by the delay memory 54 in response to the variable editing delay on line 56. The latter delay input is externally accessible and is generated by a format controller 29 of further description in FIGS. 9A, 9B.

The selectively delayed serial data stream, separated into an odd data channel and an even data channel as depicted by lines 58, 60, respectively, is applied to a formatting memory/parity generator 62 which generates the format of FIG. 2 in response to a format control input on line 64 also supplied from the format controller 29. As the serial data stream is placed in the formatting memory, the parity characters are generated bit-by-bit from an odd and even pair of data words and entered along with the audio data via the formatting memory. The format control input on line 64 controls the location of the incoming data within the formatting memory, and also controls the position of the pointer for dumping the data out of the memory. The data and parity are then applied to a CRCC generator/inserter means 66 which generates and inserts the CRCC code at the end of each IBG and sub-block of data and parity as shown in FIG. 2 in response to control signals via an input 67. The data stream is then introduced on odd and even channels to a channel encoder/sync identification-/inserter means 68. The data stream is encoded, herein utilizing, for example, the self-clocking, DC free type code of previous mention, and the sync code is inserted in the sub-blocks, in response to control signals via an input 69. The data stream is then introduced along with the sync information to add and even channels, variable IBG delays 70, 72, respectively. The latter delays are very small variable delays which accommodate varying lengths of the inter-block gap caused by mechanical tolerances, temperature, time, humidity, etc., which cause the medium length to vary while the distance between the heads remains approximately fixed. The IBG delays 70, 72 allow the system to to into record as near to the center of a theoretically ideal inter-block gap as possible, while accommodating changes in the inter-block gap taken from the recording medium which are caused by going into record at places other than the optimum center. That is, a comparison is made of the IBG off the medium, with the ideal IBG generated by the format controller 29, whereby errors in the length or position of the actual IBG are adjusted in the variable IBG delays 70, 72 via variable delay controls 74, 76, respectively. The delays are generated in response to a standard delay input on line 78 and a pair of variable IBG error signals on odd and even lines 80, 82, respectively. Thus the IBG is always recorded with the precise pre-selected length and spacing. The standard delay input on line 78 is produced by the format controller 29, which standard delay corresponds to the fixed known distance between the reproduce and record heads, e.g., the 600 mils. Thus, the odd and even channel variable IBG delays 70 and 72 are controlled both by a fixed counter running in the format controller 29 of the system, as well as a counter which is controlled by the tape information and particularly by a flywheel/control source of the de-formatter portion of the system, further explained below.

The encoded digital audio data output stream is provided in RF odd and even channels on lines 84, 86, respectively, at, for example, 750 kb/s data rate with a 375 kHz channel bandwidth. The data stream and overhead are recorded in the recording medium 29 via the record interface 30 and head or heads 31 (FIG. 6), in the improved format of FIG. 2.

During the reproduce process, the digital audio data is retrieved from the recording medium via the reproduce head or heads 33 and the interface 32 of FIG. 6. The bit synchronizer/limiter 34 extracts the data clock from the reproduced digital data and provides the recovered data in odd and even channels on lines 88, 90, respectively. The extracted clock is introduced in odd and even channels via lines 92, 94, respectively. In addition, an RF validity signal is introduced in odd and even channels via lines 96, 98, respectively, from an exterior source, e.g., an interface unit (not shown) wherein the validity signal is a first level of error detection provided by observing the playback RF signal envelope.

To facilitate the description of the circuitry, the even channel portion of the circuitry is shown in block detail, whereas the odd channel is only depicted as a single dashed block 110 since it is similar to that of the even channel.

With reference to the even channel, the recovered RF data is introduced by line 90 to channel decoder/sync detector 100, along with the even clock on line 94. The even clock is also introduced to a flywheel/control source 102 along with the associated RF validity signal on line 98. The latter signal is also introduced to a CRCC extractor/validity collector means 104, which also receives the output from the channel decoder/sync detector 100. The channel decoder portion of the block 100 decodes the recovered digital data in response to the clock on line 94, while the sync detector portion thereof detects and strips the sync code at the beginning of each sub-block. The decoded data is fed to the block 104 for CRCC extraction and validity detection. The sync information is fed to a local flywheel further described below.

The flywheel/control source 102 comprises basically a series of counters which receive the even clock signal and produce therefrom control functions which occur at a regular rate based on the incoming clock. This provides an indication of the recording medium location whereby, in the event an error has occurred, the system continues to operate at the regular rate to allow the system to return to synchronous operation. The flywheel/control source 102 provides the even IBG error signal of previous mention on line 82 to the even variable delay control 76, and also provides control signals on lines 106/116 for subsequent use, as described below.

The CRCC extractor/validity collector means 104 extracts the CRCC code from the decoded digital data, makes a comparison with the recorded CRCC code recovered from the medium, and collects all the validity information to produce a master validity formed of CRCC errors, RF validity errors, errors detected by the channel decoder, or the detection of no signal at all.

The data and parity information is applied from the block 104 to an even channel data/parity storage 108 which provides a small amount of data/parity storage to allow achieving time base correction between the two tracks of incoming data. This corrects any skewing which may occur between the two tracks to bring them back into synchrony. The storage 108 is clocked in response to an input from the flywheel/control source 102 via line 106. The synchronized tracks can then be loaded into a single large memory (via a line 111) rather than having separate large memories for each channel of information.

As previously mentioned, the odd channel receives the recovered odd RF data on line 88, the odd clock on line 92 and the associated RF validity signal on line 96, wherein the block 110 represents an odd channel of components 100', 102', 104', 106' and 108' corresponding to the even channel components 100, 102, 104, 106 and 108, respectively. Accordingly, the block 110 provides the odd channel equivalent of the IBG error signal on line 80, the output from the odd channel CRCC extraction/validity collection means 104' on a line 112, an odd channel data/parity storage 108' output on a line 114, and a flywheel/control source 102' output for the odd channel and which controls the respective odd data/parity storage 108'.

The master validity signal accumulated in the CRCC extractor/validity collector means 104, 104' in both the even and odd channels is introduced by the lines 113, 114 to a bad validity decode/parity select means 118, along with the control signal from the flywheel/control source 102 on line 116. The means 118 generates information which fixes the position of the recording medium 29 in terms of the sync information derived from the medium. The means 118 decodes the information and sets a flag for use when the system receives the next sync corresponding to the parity which has been stored, and stores the parity until such time as the parity is required to correct errors in the data.

The control signals from the bad validity decode/parity select means 118 are introduced to a parity control 120 which compares the sync ID information from the flywheel/control sources 102, 102' and determines the parity group required in order to correct any data errors. The parity control 120 is coupled to a large parity storage 122 in which parity from the data/parity storages 108, 108' of the even and odd channels has been loaded via lines 111, 112 but only if it has been determined that an error has occurred in the respective data. Parities are stored in the parity storage 122 until they are required for subsequent error correction.

Meanwhile, the data from the data/parity storages 108, 108' are loaded via lines 111, 112 into a large output memory 124 which stores all the data of, for example, two blocks of data. Parity is stored in a separate storage, i.e., the parity storage 122, in order to improve the ease of getting in and out of the parity group, since parity is required only at such time as corrections are to be made to the data. Since the data appears first in the format of FIG. 2, the system recognizes whether or not there is need to recover the parity information from the parity storage 122, prior to receiving the corresponding data.

The odd and even channels of data are re-combined in the output memory 124 and the data therefrom and, when needed, parity from parity storage 122, are introduced to a serial-to-parallel converter/error corrector means 126 in response to an address control 128 and the parity control 120. The address control 128 in turn is responsive to a write into memory address command from the flywheel/control source 102 applied via line 131, and also during unloading responds to a read address signal from the read address circuit 39 (FIGS. 6 and 11) on line 130, during the reproduce process. The means 126 provides an output which corresponds to the parallel data words originally received by the input latch/parallel-to-serial converter 52, on the same bi-directional bus 50. Thus, when in the editing mode, for example, data on the recording medium may be reproduced, processed, corrected or otherwise edited, and then replaced on the medium in exactly its initial position therein, while maintaining the data in the digital domain utilizing the digital data cycling loop of previous mention in FIG. 6. FIGS. 8A, 8B, 8C and 8D show in schematic one implementation of the formatter circuit shown in block in FIG. 7. Similar components between the two Figures are identified by the same numerals. In FIG. 8A, the variable editing delay input 56 is depicted, by way of example only, as supplied via a ring counter 132 and switch means 134 which, in combination, provide the particular delay corresponding to the distance that the reproduce and record heads are spaced apart along the recording medium. The switch means 134 provides the input to the ring counter which counts through its states and loads the value that is entered upon reaching the full state. In a preferred alternative, the variable editing delay control input 56 is coupled to an external bus to permit the variable timing of external editing processes to be performed via an external editing device (not shown).

The record delay memory 54 comprises a series of memories 136 coupled to the input 56. The ring counters 132 and memories 136 are clocked via a multivibrator 138, in response to clocking via a line 140 extending to the format controller 29 of FIG. 9A.

The input 50 comprises the digital data 16 bit bi-directional bus extending from the A/D converters 22 of, for example, the circuit of FIG. 6. The bi-directional bus 50 further is coupled to the bi-directional output bus of the deformatter of FIGS. 10A-10G to provide a common bus which may be controlled via other exterior circuits, such as, for example, other audio channels whereby information from various channels can be dubbed in, transferred, etc. Ergo, the bi-directional bus 50 performs the function of a patchbay to allow crosspoint switching and thus various mixing, editing, etc., operations commonly employed in handling audio signals. The 16 bit audio samples are fed to input latches 142 of the input latch/parallel-to-serial converter 52, whose outputs in turn are fed to the D inputs of the memories 136 and to the parallel input pins of a series of parallel-to-serial converters 144. Thus, the input latches 142 allow storing a digital word corresponding to a digital sample into the memories 136, and at some subsequent time later reading the stored digital word from memories 136 and placing it in parallel in one of two pairs of parallel-to-serial converters 144. Thus, alternate digital words received by input latches 142 are subsequently placed in alternate pairs of converters 144 to provide odd and even channels of digital words. Thus the input latch/parallel-to-serial converter 52 provides successive digital words on alternate even and odd data lines 60, 58, respectively. The input latches 142 are clocked via a 6 MHz line 146 from a master clock generator (not shown) and a PROM 148 which is coupled to external means for performing the various audio signal handling processes. The converters 144 are alternately loaded via NAND gates and input 150 from the format controller 29 of FIG. 9A.

In FIG. 8B, the odd and even data words are serially stored in a pair of memories 152 which comprise the formatting memory portion of the means 62. In addition, bit-by-bit parity is generated via an exclusive OR 154 for each data word, and is also stored along with the respective pair of odd and even data words corresponding to the parity word. The memories 152 are controlled via the format control input 64 generated in the format controller 29.

The odd data, even data and associated parity in the memories 152 are directed to output shift registers 156 via a channel selection switch 158 in response to inputs from the format controller 29 on lines 159 (FIGS. 9A, 9B). In response to channel selection commands on lines 160, even data is loaded into an even shift register, odd data into an odd shift register, with parity distributed between the two shift registers in accordance with the format of FIG. 2. The data and parity are then introduced via selection switch 162 and input 163, to a pair of respective CRCC cyclic check character generators 164. The CRCC generators are coupled to a multiplexer 165 whereby the CRCC codes are added to the ends of the data and parity sub-blocks, in response to inputs on the lines 67 from the format controller 29.

Referring to FIG. 8C, the multiplexed data and parity sub-blocks are introduced to switch means 166 which provide selection between the data streams and parity. The data stream is represented as $X_{k-1}$, $X_k$ and $X_{k+1}$, which are the bits to be encoded, according to the rules of a DC free, self-clocking code, at the outputs of both of the switches 166 in the odd and even channels. The data bits to be encoded are introduced to odd and even data selector/multiplexers 168 which, in response to lines 69, inserts the last four (of the last five) bits of the 12 bit sync information inserted at the beginning of each sub-block, and which identify each sub-block. The even and odd data with CRCC and the ID inserted are fed to respective PROMS which, together with subsequent latches, form channel encoders 170 of the channel encoder/sync ID/inserter 68. The channel encoders 170 also receive controls via lines 69 which enable the PROMS to recognize the input data stream as either information concerning synchronization, or data to be encoded. The PROMS provide clocking if the information concerns synchronization, wherein they are clocked through a series of states to produce a series of output pulses corresponding to the first seven bits of the sync information which, together with the last 5-bit ID are then inserted at the beginning of the data and parity sub-blocks. Upon receiving digital data, the PROMS 170 encode the data bits as determined by the particular code utilized, which is a DC free, self-clocking type code as previously mentioned. The data streams $A_k$ and $B_k$ of the even and odd channels are in the encoded domain, wherein $A_k$ represents the beginning of a cell transition and $B_k$ represents a mid-cell transition of the particular code form being used.

The encoded data is introduced to respective odd and even variable IBG delays 70, 72, respectively, which provide means for maintaining the record entry point at the exact center of a theoretical inter-block gap (IBG). As shown in FIG. 8D, the variable IBG delays 70, 72 are coupled to respective variable delay control means 74, 76. Means 76 is similar to means 76 and accordingly, the former is depicted within the phantom line in FIG. 8D. Control of the variable IBG delays 70, 72 is provided by the pair of input delay signals, i.e., the odd and even IBG error signals on lines 80, 82 as well as by the standard delay signal on line 78. The latter delay input on line 78 extends from the format controller of FIG. 9B and constitutes a delay which is added to that delay encountered in the decode, de-format, TBC and error correction processes during reproduce, such that the total delay is equal to the fixed known distance between the reproduce and record heads along the recording medium. The IBG error signals on lines 80, 82 extend from the even and odd master flywheel/control sources 102, 102', and constitute even and odd delay error signals corresponding to small variations in the fixed delay caused by temperature, humidity, mechanical, etc., conditions which produce recording medium length variations along the spacing between the heads, and also include an even and odd clock from the master flywheel/control sources 102, 102'. The IBG sync signal from the recording medium via the circuits of FIG. 10B, is compared to a reference signal via up/down counter means 172 and a comparator circuit 174, which reference signal is applied from the format controller 29 FIG. 9B, as the standard delay line 78. The resulting error signal is in the form of a digital word commensurate with the number of bits of error between the sync signal from the medium and the reference signal. The digital error word produces an offset in the variable IBG control means via 4-bit adders 176 and multiplexer switch 178 which, in turn, generates the corresponding delay in the variable IBG delays 70, 72 to force the record head to enter the format on the recording medium at the theoretically perfect center of the IBG. That is, if the IBG is too long, the delays 70, 72 will cause the system to enter the recrod process early deleting a number of clock pulses equivalent to the error, whereas if the IBG is too short it will enter the record process later thereby adding some clock pulses, so as to provide IBG's with predetermined length, e.g., 216 bits in the example herein.

Although only the even channel variable delay control means 76 is shown in schematic herein, the odd channel variable delay control means 74 is identical, and integrally coupled to the variable IBG delay 70 as described above.

The delay circuitry is included in respective channels since the information from the channel encoder/sync ID inserter 68 is no longer time synchronous since the system is locking the data that is being recorded in the medium, to data that has been previously recorded therein. In the case where recording initially is being made, i.e., where no recording has been made on the medium before, the error signal received from the recording medium is deleted, i.e., is a zero error signal, which fixes the record entry and exit points at the exact center of the theoretically perfect IBG's.

The blocks and sub-blocks of data and parity, with then CRCC and sync information inserted (FIG. 8C), are the introduced via channel selector switch 180 to a level-to-transition converter 182 which changes state whenever a transition should occur on the tape in accordance with the encoded data. The resulting data is introduced to the record interface means 30 and thus the record heads 31 (FIG. 6), via output buffers 184 on odd and even channels 84, 86.

Regarding now FIG. 9A and 9B, the format controller 29 thereof generates all the specialized pulses and waveforms which are required to control the formatter 24 and channel encoder 28 of FIGS. 6, 8A-8D. For example, the format controller generates control signals for the insertion of the synchronization and CRCC codes via lines 69, 67, the channel encoding process via a 750 kHz line, the format configuration and spacing via lines 64, the standard delay for a given IBG length on lines 78, and the various signals for the clearing and setting of the counters, latches, etc. The format controller generates the pulses and waveforms in response to a master clock (not shown) which, in turn, generates, in generally conventional fashion, various signals of several frequencies all locked to, for example, an 18 MHz signal generates via a crystal oscillator.

Thus in FIG. 9A the input 200 includes signals of various frequencies specified here by way of example only, while the outputs from the format controller 29 corresponding to the control inputs of the formatter 24 and channel encoder 28 of FIGS. 8A-8D are identified with similar identifying labels and/or numerals. Thus, the format controller 29 determines the rates at which information is loaded into, and unloaded from, the formatting memory 152 of FIG. 8B. Since the rates are different, there is provided within the format controller 29 write address counter means 202 moving in 16 bit increments, and read address counter means 204 moving at 160 bit increments. The counters 202, 204 are coupled to multiplexer switches 206 which in turn select the write or read address control and supply same to the formatting memory 152 via the format control input 64. Once every five blocks the counter's 202, 204 respective read and write adders are compared to prohibit the write address from overwriting data which has not yet been read out. This is accomplished by PROMS 205, 207 and a counter 209.

In FIG. 9B, the format controller 29 includes counters 208, 210 which are locked back to a 250 Hz data block rate control signal from input 200, which in turn is locked into the 18 MHz signal of the master clock (not shown) of previous mention. By way of example, the counter 208 counts 184 or 240, while the counter 210 counts the sub-block sync identification number. The counter 208 is coupled to a decoder 212, whereby the counter counts out during a data block and has decoded therefrom the 12 bits of sync information, the 160 bits of data and parity information, and the 12 bits of CRCC information. During the inter-block gap, the counter 208 counts out 240 bits corresponding to the inter-block gap plus the IBG sync word and the CRCC code. The counter 210 counts out the sub-block ID number. Thus the format controller 29 performs the function of controlling the generation of the particular configuration corresponding to the format of FIG. 2, including the insertion of the sync and CRCC information and the generation of the specific sub-block and block format configuration in two tracks of the recording medium.

Referring now to FIGS. 10A-10G, the channel decoder 36 and the de-formatter/TBC/error detector/corrector 38 and the channel decoder are implemented, by way of example only, wherein like components of FIGS. 6 and 7 are similarly numbered. As depicted in FIG. 7, the odd channel portion of the de-formatter 38 which is identical to the analgous even channel portion is shown in dashed block 110 to simplify the description. Accordingly, in FIG. 10A, 10B, the RF even channel digital audio data from the recording medium, the even clock and the even RF validity signals are applied via input lines 90, 94 and 98, respectively. The even IBG error signal is provided on output lines 82, which include a pair of error signals and an IBG clock. Likewise, the odd channel includes the inputs 88, 92, 96 and an output therefrom corresponding to the IBG error signal 80 formed of a pair of odd error signals and an odd error clock.

The data input 90 is fed to a latch and serial-to-parallel converter 230, which is coupled in turn to an even channel decoder 232 and to a sync stripping gate circuit 234. The channel decoder 232 may comprise a programmable read only memory (PROM) which contains information concerning the channel code and provides decoding of the recovered data in a manner generally known in the art. The sync stripping gate circuit 234 compares the incoming sync information, i.e., the first 7 bits which define the unique sync word, to a standard fixed pattern which represents the synchronization pattern. The detected sync produces a pulse which is applied to a local flywheel circuit 236 which counts and controls the stripping off of the remaining, i.e., five, bits of the 12-bit sync word. (Note that only four of the five bits are actually used here.) The latter 5-bit word is the ID information which identifies each of the sub-blocks of the recovered blocks of data. The local flywheel 236 also variously controls the CRCC extracter/validity collector 104 (FIG. 10B) which discerns whether or not the incoming data is valid at the end of each sub-block. The even clock on line 94 and the RF validity on line 98 are fed to the even master flywheel/control source 102. The validity signal of both the odd and even channels is obtained via external circuitry (not shown) such as the reproducer apparatus, by looking at the level of the RF signal envelope with reference to a predetermined value, whereby accordingly the validity signal provides a first level of capability to discern whether or not information is being retrieved from the tape.

The master flywheel/control source 102 (and 102') is a circuit for counting transitions in the clock stream in continuous fashion in response to the double rate clock on line 94, and includes two counters 238 for producing a 184/240 count, and a separate counter 240 for producing a count corresponding to the sub-block sync rate.

The master flywheel/control source 102' of the odd channel provides controls only to a selected point of the circuitry of the FIGS. 10A, 10B, i.e., to the point where the information is loaded into the data/parity storage 108'. Thereafter, the even channel master flywheel/control source 102 provides the various controls for overall synchrony between the parity, data storage and output memory control signals, as further described below. It may be seen that the master flywheel/control sources 102, 102' are similar to the circuitry in the format controller 29 of previous description, FIG. 9B.

The local flywheel 236 follows closely the recording medium movement, while the master flywheel/control sources 102, 102' have more inertia, i.e., are not reset every time a synchronization pulse is detected by the respective sync stripping gate circuits 234, 234'. Thus utilizing the local and master flywheels together provides time windows during which the sync pulse does not reset the master flywheel if a sync pulse is not expected. Receipt of an unexpected sync pulse results in an indication that there is bad validity during that period of time and the validity line is checked to establish the validity of the data via the CRCC extractor/validity collectors 104, 104'. The latter 104, 104' also receive error detection from their respective channel decoders 232, 232', as well as the RF validity signal check provided from the reproducer apparatus, providing thus several levels of capability to check the validity of the reproduced data.

In FIG. 10B the CRCC extractor/validity collectors 104, 104' of the even and odd channels generate respective master validity signals on lines 113, 114, which are introduced to the bad validity decode/parity select means 118 (FIG. 10E) along with the identification numbers (ID1–ID4) on lines 116 of the even channel flywheel/control source 102. The master validity signals provide information concerning the total state of the data that is being retrieved from the recording medium, and is used to discern which track to lock the system to, and also for indicating which track, or tracks, have problems to determine the type of correction or concealment to be effected upon unloading the data from the output memory 124. In addition, the master validity signals of the even and odd channels are sent via outputs 246 and 246' to a peripheral control interface board (not shown) to select a track to lock the capstan reference of the audio recorder/reproducer (not shown).

The master flywheel/control sources 102, 102' thus selectively load data coming from respective tracks of the recording medium, into a series of shift registers 247 of the data/parity storage 108, 108', by means of clock signals fed to AND/OR gates 248 (and 248' of the odd channel). Thus data is loaded into a first shift register, as data is being dumped out of a second shift register, whereupon a third shift register may be loaded while the second shift register is being dumped, etc. Thus there is always a process of writing first and reading later to allow flexibility in correcting for time base correction between two tracks, i.e., one sub-block of time base correction is allowed.

The even and odd output from the data/parity storages 108, 108' consists of the initial data plus the parity information, which has been stripped of all the sync and CRCC information by the sync stripping gate circuits 234, 234' and the CRCC extractor/validity collectors 104, 104'. The data is always stored into the output memory 124 whether it is valid or not. Thus when dumping data out of the output memory 124, the system continuously dumps data and looks at validity. Since the data is always stored in the output memory 124, and since validity is continuously being checked, the system knows when there is any data error and exactly when, i.e., in which sub-block, track, etc., the error has occurred. The even and odd data is fed to the output memory 124 (FIG. 10F) via the lines 111, 112 and respective multiplexers 249, 249', while the parity is selected and stored into shift registers 251 comprising the parity storage 122 (FIG. 10C). The parity is controlled by separate read and write functions and locations. Thus a pair of synchronous binary counters in combination with a decoder/demultiplexer define a write into parity shift register circuit 250 (FIG. 10D), which is coupled via AND gates to the shift registers 251 of the parity storage 122. The write into parity shift register circuit 250 which controls the write into parity shift register clock is in turn controlled via a divide-by-160 circuit 252 formed of a pair of synchronous binary counters 253 arranged to count to 160 (FIG. 10E). The write into parity shift register circuits 250, 252 are in turn controlled via comparator 254 as described below.

The bad validity decode/parity select means 118 receives the odd and even master validity information via lines 114, 113 from the respective master flywheels 102', 102 and the local flywheels 236', 236, as well as the 4-bit information via lines 116. The means 118 comprises a decoder and the resulting decoded 4-bit ID is introduced to the parity control means 120 and particularly to a pair of register files 256 with three-state outputs.

The parity control means 120 and comparator 254 in turn provide various controls for selectively storing parity in the parity storage 122 in response to the master validity information and the clocking controls from the even master flywheel/control source 102. Thus, in response to the master validity information, the parity control means 120 stores parity in the event that the validity information indicates an error has occurred in the data.

In response to the even master flywheel/control source 102, a write into output memory counter 258 (FIG. 10E) provides for loading the data information into the output memory 124 via lines 111, 112 in response to control lines 260. Further, a write into memory address command is generated on the line 131 via a register file 261 (FIG. 10C) which generates the write address in response to the master flywheel/control source 102. The write into memory address command comprises the sync identification information, i.e., the last four bits of the sync word. The file register 261 defines a delay device which dumps out information corresponding to the location of the ID information which identifies the data sub-block being handled. The output lines 131 are applied to the address control means 128 as further described below.

The validity information introduced along with the data to the output memory 124 is generated via a data selector/multiplexer means 262 (FIG. 10D) which generates odd and even validity signals on output lines 264 extending to the output memory 124. The lines 264 are bi-directional and are also used when dumping data out of the output memory 124 to read out the respective parity bits from the parity storage 122 via a data selector/multiplexer 266 (FIG. 10C) and parity gates 268 (FIG. 10D). During the unload output memory 124 process, even and odd data out information is provided on lines 270 which extend to the serial/parallel converter/error corrector 126. In addition, error correction/concealment control information are provided on lines 272 via a data selector/multiplexer means 284 and gating means 286, which controls are applied to a pair of PROMS 288 of the corrector means 126 (FIG. 10G). When the data is retrieved from the output memory 124, it is compared bit by bit with parity from the parity storage 122 via the parity gating circuit 268, in response to the validity information which was stored with the data. If the validity of the data and/or the validity of parity is bad, for either or both tracks, error signals defined as even or odd channel first order hold are delivered to the PROMS 288 via lines 272. If an even first order hold is generated, correction is performed as described hereinbefore using the odd channel of information and parity, whereas if an odd first order hold is generated the process is applied using the even channel of data with parity. If both even and odd first order hold commands are generated on lines 272, a zero order hold concealment is preformed in the error corrector means 126 as previously described.

The process of error correction is performed as the data and associated validity is being dumped from the output memory 124. As previously mentioned, as the data was loaded into the output memory, the validity determined whether or not parity was stored in the parity storage 122, i.e., if the validity indicated bad data, the associated bit-by-bit parity was stored also. Thus upon dumping the data and validity information from the output memory 124, the system extracts the associated parity when it is required to perform the required correction or concealment processes. The unloading of data and validity information from the output memory 124 is under control of the read address circuit 39 of FIG. 11, which controls are introduced via the control line 130.

Referring now to FIG. 10F, the address control 128 includes a series of multiplexing switches 290, which are controlled via the line 130 from the read address circuit 39 to control the unloading of the output memory 124.

During the memory loading process, the last four bits comprising the ID information of the sync information are applied via the line 131 in FIGS. 10C and 10G, to a pair of PROMS 292, and thence to a write into memory address means 294 comprising a series of synchronous binary counters. The binary counters of the memory address means 294 are thence coupled to the data selector/multiplexers 290 of the address control 128.

The unloaded data and associated validity information are fed via lines 111, 112 and 264 from the output memory 124 of FIG. 10F to a serial-to-parallel converter 296 of FIG. 10G of the serial/parallel converter/error corrector 126. The parallel data words are then fed to the error corrector portion of the means 126 and particularly to a series of arithmetic logic units 298 coupled to the pair of PROMS 288. The error control process is performed in the logic units 298 in response to the various correction/concealment commands on line 272 and the PROMS 288. Validity information is examined by PROM 288 and the data is corrected if there is enough parity information. If there is not sufficient parity information, then concealment or masking techniques are employed as previously described.

Thus correction and concealment are provided via simple instructions which are clocked in by the PROMS 288. The corrected or concealed digital audio data is then coupled to the bidirectional bus 50 via output buffers 300 which isolate the bidirectional bus from the output of the error corrector 298. The digital audio data is provided to the bidirectional bus 50 when it is addressed via an external control 302 which is situated in the control interface apparatus of the system (not shown). Thus various keyboard commands are instituted via the external control 302, such as, for example, recording one channel of information into different channels, outputting audio data in digital form to external apparatus, performing various editing processes on the data, etc.

Various modifications may be made to the circuitry and components thereof within the concepts of the invention: for example, the shift registers of the parity storage means 122 and the output memory means 124 could be combined and replaced with a large memory. The control processes for writing-in and reading-out of the memory would be generally similar and supplied by the master flywheels, but would generally be combined.

In addition, the local flywheels 236, 236' may be omitted, wherein the master flywheels are used to provide all control signals to the various parity and data storages. The system would be somewhat less sensitive to recording medium fluctuations, etc.

Further, the digital audio input data may be introduced on bi-directional bus 50 in serial rather than parallel, or may be instantly serialized upon introduction. Then the record delay memory 54 and the formatting memory 62 may be combined and replaced by a large memory. Controls would be similar to those presently shown.

Although the improved format and error correcting and concealment techniques have been described herein with particular reference to a digital audio system, it is to be understood that the concepts herein are equally applicable to other data handling systems, ergo, high rate instrumentation devices which require reliability. Thus, for example, in the fields of satellite, airborne, etc., telemetry several signal channels of the digital audio recorder/reproducer described herein, in combination with a data multiplexing means, may be employed to record an incoming single channel of data at very high bit rates.

We claim:

1. A method for recording a signal as digital data in a recording medium, comprising the steps of;
   - generating error correction information for a given pair of separate sub-blocks thereof;
   - selectively separating alternate words of the series of digital words into respective separate sub-blocks of data;
   - generating error correction information to define separate sub-blocks thereof;
   - interspersing error detection and sync information within given locations in each data and error correction sub-blocks; and
   - recording a selected succession of sub-blocks of data and error correction information within at least two separate tracks in the recording medium to define data blocks with selected inter-block gaps therebetween.

2. The method of claim 1 further including;
   - generating odd and even sub-blocks of data from odd and even digital words, respectively, of said series; and
   - further generating a parity sub-block with respect to a given pair of the odd and even data sub-blocks to define the error correction information.

3. The method of claim 2 wherein the step of recording the blocks includes;
   - recording the odd and even sub-blocks of data in respective odd and even tracks in the medium; and
   - recording parity sub-blocks in odd and even tracks with minimum distance from related odd and even data sub-blocks.

4. The method of claim 3 further including;
   - recording the inter-block gaps between data blocks to define physical spaces of selected length for going into and out of record mode with no irretrievable destruction of data, and
   - interspersing gap snyc and error detection information within the given locations of the gap length.

5. The method of claim 4 further including;
   - generating a check character code for insertion in each data and parity sub-block to define the error detection information; and
   - generating a sync code for insertion in each data and parity sub-block to define the sync information.

6. The method of claim 5 further including;
   - recording the sync code and check character code at the beginning and end, respectively, of each data and parity sub-block.

7. The method of claim 6 wherein the sync information includes a plurality of sync bits of a unique word followed by a plurality of sub-block identifying bits.

8. The method of claim 5 wherein the recorded digital data is retrieved from the recording medium, with optimized data error correction and concealment, further including the steps of;
   - detecting any data errors in the data retrieved from the two tracks via the check character code; and
   - reconstituting the original digital data utilizing selected good data and associated parity sub-blocks in the event one data sub-block has an error.

9. The method of claim 8 wherein;
   - the step of detecting data errors further includes detecting a data error occurrence in one of the odd or even data sub-blocks by comparing the retrieved check character code with the initial check character code; and
   - the step of reconstituting includes correcting the data of the odd or even data sub-block having the error, using the respective parity sub-block along with the data from the other even or odd data sub-block in which no error has occurred.

10. The method of claim 8 wherein;
    - the step of detecting data errors includes detecting a data error occurrence in one of the odd or even data sub-blocks and its associated parity sub-blocks by comparing the respective retrieved check character code with the initial check character code; and
    - the step of reconstituting includes partially reconstructing the data and concealing the error using the data from the other data sub-block in which no error has occurred.

11. The method of claim 8 wherein;
    - the step of detecting data errors includes detecting the loss of a portion or all of one odd or even track of data; and
    - the step of reconstituting includes substituting the data from the other track to approximate the data in the track which was lost.

12. In a method for recording digital audio data in a recording medium the method for providing an improved digital audio data format comprising the steps of;
    - generating successive series of digital words representing the digital audio data;
    - separating the digital words into odd and even sub-blocks of digital audio data;
    - generating a parity sub-block for a given pair of the odd and even data sub-blocks;
    - recording the given pair of data sub-blocks in selected spaced apart relation with their respective parity sub-block to define a triad configuration in two tracks of the recording medium;
    - recording successive triads in the recording medium to define a data block; and
    - recording successive data blocks in the recording medium with selected inter-block gaps therebetween to define the improved format.

13. A digital recorder for digitally recording an input signal in a recording medium via an improved digital data format, the combination comprising;
    - means for generating successive series of digital words representing the input signal;

formatter means coupled to the means for generating the digital words and including, means for constructing the digital data format of a succession of precisely spaced apart data blocks formed of a selected arrangement of sub-blocks of said digital words and including respective sub-blocks of parity information, with error detection and sync information interspersed in each data and parity sub-block; and means coupled to the formatter means for simultaneously recording the data blocks in separate tracks in the recording medium with precise inter-block gaps therebetween.

14. The recorder of claim 13 wherein;

the means for constructing further includes means for forming alternate digital words into odd and even sub-blocks of digital data selectively disposed in the respective odd and even tracks in the recording medium;

means for generating respective parity sub-blocks from the data sub-blocks, and error detection and sync information;

means for interspersing the error detection and sync information within each of the odd and even data and parity sub-blocks; and wherein the means for recording records a succession of pairs of data sub-blocks with a respective parity sub-block to define successive blocks of data selectively spaced from respective parity along the odd and even tracks with the precise inter-block gaps between the data blocks.

15. The recorder of claim 14 wherein;

parity is generated from successive odd and even digital word pairs of the series of digital words to define the parity sub-block associated with the respective odd and even data sub-blocks;

wherein the parity sub-blocks are disposed in odd and even tracks with minimum spacing thereof from the associated data sub-tracks; and wherein a selected plurality of combined data and associated parity sub-blocks are successively recorded to define each of the spaced-apart data blocks.

16. The recorder of claim 15 further including channel encoder means coupled to the means for interspersing the error detection and sync information for placing the data and parity sub-blocks in form for recording; and variable delay means coupled to the channel encoder means and to the means for recording for selectively varying the length of the inter-block gaps to provide the encoded and precisely spaced-apart data blocks for recording in the odd and even tracks.

17. The recorder/reproducer of claim 16 wherein;

the means for forming alternate digital words into odd and even data sub-blocks includes input latch/parallel-to-serial converter means;

the means for generating the parity sub-blocks includes parity generator means coupled to the parallel-to-serial converter means for generating a plurality of parity words from successive pairs of odd and even digital words;

the formatter means includes a formatting memory coupled to the parity generator means for storing the odd and even data and the associated parity;

the means for generating error detection information includes cyclic redundancy check character generator means coupled to the formatting memory;

the means for generating sync information includes sync generator means coupled to the check character generator means for generating a unique digital sync word and identification information definitive of the respective data and parity sub-blocks;

the means for interspersing the error detection and sync information includes check character and sync insertion means integral with the check character and sync generator-means respectively for inserting the check characters and sync within the end and beginning respectively of each data and parity sub-block; and the means for recording the succession of sub-blocks and blocks includes channel encoder means coupled to the check character and sync generator means and the check character and sync insertion means, and variable inter-block gap delay means coupled to the channel encoder means for generating odd and even channels of encoded data for storage in the odd and even tracks of the recording medium.

18. The digital audio recorder of claim 15 including a reproducer for retrieving the odd and even tracks of recorder digital data via the digital data format and further comprising;

de-formatter means for receiving the retrieved digital data and for detecting, correcting and/or concealing any data errors via the error detection information and in each sub-block and the parity sub-blocks, to reconstitute the original input signal; and controller means coupled to the formatter and de-formatter means for generating a master clock and sub-multiple clocks to control the recording and retrieving of the improved digital data format.

19. The recorder/reproducer of claim 18 wherein the deformatter means includes;

means for decoding the odd and even retrieved digital data;

means for detecting any data errors in the decoded data via the error detection information interspersed in each sub-block; and means for correcting any detected errors in one of the odd and even data sub-blocks via the parity information in the respective parity sub-block and the other of the odd and even data sub-blocks to reconstitute the original input signal.

20. The recorder/reproducer of claim 19 wherein the means for correcting further define, means for concealing any detected errors in both of a pair of data sub-blocks by interpolating between, or holding, good data in the data sub-blocks.

21. The recorder/reproducer of claim 20 further including;

bi-directional bus means inter-coupling the input to the formatter means and the output from the deformatter means and variously interrupted via external process means for editing, mixing and other signal handling processes.

22. The recorder/reproducer of claim 21 further including;

flywheel/control source means variously coupled to the means for detecting and correcting for supplying a continuous clock and associated control signals which occur at a regular rate determined by the master clock, to allow synchronous operation and an odd and even inter-block gap error signal;

means for extracting the check character code and generating a validity signal indicative of the occurrence or absence of data errors;

means for storing parity information operatively coupled to the means for decoding and responsive to the means for extracting and generating validity, to store parity only upon the occurrence of a data error;

output memory means operatively coupled to the means for decoding for continuously storing data with or without errors in response to the flywheel/control source means; and means for correcting/concealing any data errors coupled to the output memory means and to the means for storing parity to provide selected error correction and concealment in response to the validity signal.

23. The recorder/reproducer of claim 22 further including odd and even data parity storage means coupled to the means for decoding to the means for storing parity and to the output memory means, for temporarily storing parity and data in response to the flywheel/control source.

* * * * *